US011777098B2

(12) United States Patent
Ji et al.

(10) Patent No.: US 11,777,098 B2
(45) Date of Patent: Oct. 3, 2023

(54) METHOD AND SYSTEM FOR FUNCTIONAL CONDUCTIVE POLYMER INITIATED CATHODE ELECTROLYTE INTERFACE FOR SILICON ANODE-BASED LITHIUM ION BATTERIES

(71) Applicant: Enevate Corporation, Irvine, CA (US)

(72) Inventors: Liwen Ji, San Diego, CA (US); Benjamin Park, Mission Viejo, CA (US); Jose Vega, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 324 days.

(21) Appl. No.: 16/859,989

(22) Filed: Apr. 27, 2020

(65) Prior Publication Data

US 2021/0336268 A1  Oct. 28, 2021

(51) Int. Cl.
*H01M 4/62* (2006.01)
*H01M 4/131* (2010.01)
*H01M 4/134* (2010.01)
*H01M 10/058* (2010.01)
*H01M 4/505* (2010.01)

(Continued)

(52) U.S. Cl.
CPC .......... *H01M 4/624* (2013.01); *H01M 4/131* (2013.01); *H01M 4/134* (2013.01); *H01M 4/386* (2013.01); *H01M 4/505* (2013.01); *H01M 4/525* (2013.01); *H01M 4/62* (2013.01); *H01M 10/058* (2013.01); *H01M 10/0525* (2013.01); *H01M 2300/0082* (2013.01)

(58) Field of Classification Search
CPC ...... H01M 4/624; H01M 4/131; H01M 4/134; H01M 4/386; H01M 4/505; H01M 4/525; H01M 4/62; H01M 10/0525; H01M 10/058; H01M 2300/0082
See application file for complete search history.

(56) References Cited

U.S. PATENT DOCUMENTS

| 2015/0050555 A1* | 2/2015 | Fukumine | H01M 10/052 429/217 |
| 2017/0200943 A1* | 7/2017 | Kawakami | H01G 11/40 |
| 2020/0388881 A1* | 12/2020 | Ji | H01M 10/0568 |

FOREIGN PATENT DOCUMENTS

| JP | 2017041355 A | * | 2/2017 | |
| WO | WO-2018075469 A1 | * | 4/2018 | C08L 71/02 |

OTHER PUBLICATIONS

Machine translation of JP 2017-041355A (Year: 2017).*

* cited by examiner

*Primary Examiner* — Eugenia Wang
(74) *Attorney, Agent, or Firm* — McAndrews, Held & Malloy, Ltd.

(57) ABSTRACT

Systems and methods for conductive polymer monomers as cathode additives for silicon-based lithium ion batteries may include a silicon-based anode, an electrolyte, and a cathode. The cathode may include an active material and small amounts of dispersed conductive polymer monomer additive. The cathode active material may include one or more of nickel cobalt aluminum oxide (NCA), nickel cobalt manganese oxide (NCM), lithium iron phosphate (LFP), lithium cobalt oxide (LCO), and lithium manganese oxide (LMO). The conductive polymer monomer additive may any known monomer based on thiophene, aniline, and/or pyrrole core structures alone or in combination. The conductive polymer monomer additive may comprise 5% or less by weight of the active material, or 1% or less by weight of the active material, or 0.5% or less by weight of the active material.

8 Claims, 19 Drawing Sheets

(51) Int. Cl.
*H01M 4/525* (2010.01)
*H01M 10/0525* (2010.01)
*H01M 4/38* (2006.01)

METHOD AND SYSTEM FOR FUNCTIONAL CONDUCTIVE POLYMER INITIATED CATHODE ELECTROLYTE INTERFACE FOR SILICON ANODE-BASED LITHIUM ION BATTERIES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for conductive polymer monomers as cathode additives for silicon-based lithium ion batteries.

BACKGROUND

Conventional approaches for battery cathodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for conductive polymer monomers as cathode additives for silicon-based lithium ion batteries, substantially as shown in and/or described in connection with at least one of the Figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
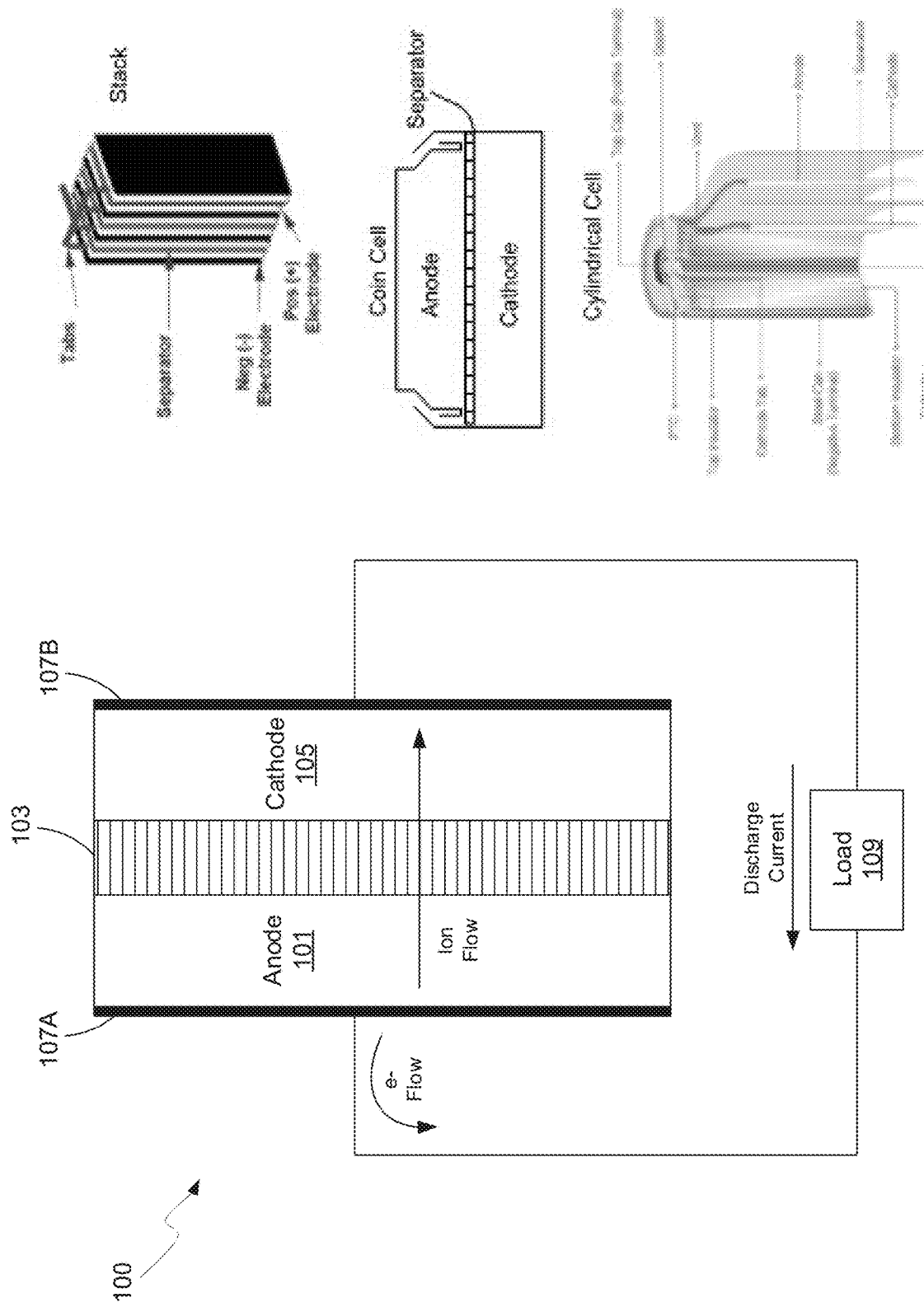
FIG. 1 is a diagram of a battery, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), di-fluoroethylene carbonate (DiFEC), trifluoropropylene carbonate (TFPC), vinyl carbonate (VC), Propylene Carbonate (PC), Dimethyl Carbonate (DMC), Ethyl Methyl Carbonate (EMC), Diethyl Carbonate (DEC), etc. with dissolved lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium difluoro(oxalate)borate (LiDFOB), lithium bis(oxalato)borate (LiBOB), and lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g at high temperature and 3579 mAh/g at room temperature. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), graphite, graphene, etc. and/or a mixture of these have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Among all the potential cathode active materials, Ni-rich NCA (Nickel cobalt aluminum oxide) and NCM (Nickel Cobalt Manganese Oxide) are considered to be most promising. Ni-rich NCA or NCM cathodes show excellent thermodynamic stability and specific capacity as high as 200 mAh/g. Although NCA or NCM are best known for long-term stability and high energy density, they have also been shown to be problematic due to poor cycle stability and low electronic conductivity.

It is generally believed that the capacity of the cathode materials is one of the major limiting factors for the energy density of Li-ion batteries. Therefore, Ni-rich cathode materials (such as NCA, NCM) and Li-rich layered oxide cathode materials have been considered and explored as the possible future choices because of their high specific capacity and low cost. These materials are especially useful if they can be coupled with high capacity and low-voltage anode materials, such as Si. However, these cathode materials have some fundamental challenges, such as irreversible phase transition from hexagonal through cubic to rock salt structure, mechanical crack of the secondary particle structure, electrolyte depletion that is often accompanied by impedance increase and volumetric swelling of the batteries, as well as gelation of cathode slurry in the slurry-making process.

Notwithstanding continuing improvements in cathode technology, there remains a need to address technological hurdles concerning the cyclability, rate capability, and thermal stability. Cell performance deterioration in Ni-rich cathode-based cells has been proposed to be associated with aggressive chemical, structural and mechanical degradation occurring on both Ni-based cathode the high capacity anodes (e.g., Si-dominant anodes and the like). The deterioration may be due in part to (i) parasitic oxidation of electrolyte components catalyzed by the delithiated cathodes at high voltage, (ii) dissolution of the active cathode material aggravated by acidic species attack from the electrolyte (e.g., HF), (iii) irreversible structural changes induced by large internal strains during repeated delithiation/lithiation, (iv) sustainable parasitic electrolyte reduction and consumption of active Li ions in forming a thick and unstable SEI layer on the surface of anodes, triggered by the crossover of the active mass dissolution products from the cathode sides (e.g. transition metal ions).

From the cathode side, a number of strategies may be utilized to overcome these issues, such as cation doping for stabilizing the cathode material lattice structure, surface coating for protecting cathode particles from parasitic reactions with the electrolyte components, synthesizing concentration-gradient or core-shell structures with high Ni content core for stabilizing the material's surface chemistry, as well as using electrolyte additives for chemically trapping the released oxygen.

While some prior surface treatments with conducting polymers can be effective in ameliorating charge capacities and cycling performances for a wide range of lithium-ion batteries, all such existing treatments require additional processing steps (e.g., precipitating, washing, and/or heating) which increases the manufacturing cost.

Without negative impacts on the anode, electrolyte, and the battery manufacturing procedures or design, adding a cathode additive is considered to be another efficient, cost-effective and practically feasible strategy to overcome the barriers of layered cathode materials and to improve the full cell performance. The aspects and example embodiments described and claimed herein simplify the manufacturing process and treatments by dispersing small amount of conductive polymer monomers, such as functional thiophene compounds, functional pyrrole compounds, and functional aniline compounds, into the normal cathode-coating slurry to prepare the additive-containing cathodes for Li-ion batteries.

Conductive polymer monomers, including example embodiments comprising thiophene-based monomers, pyrrole-based monomers, and/or aniline-based monomers (e.g., 3,4-thiophenedicarboxylic anhydride (TDCA), 3,4-difluoro-2,5-bis(trimethylsilyl)thiophene (DFBTST), 1-(2-cyanoethyl) pyrrole (CEP), thiophene-2-carboxylic anhydride (TCA), 1H-pyrrole-2-carbonitrile, 1-ethenyl-1H-pyrrole, 2-ethenyl-1H-pyrrole, 1-ethynyl-1H-pyrrole, 2-ethynyl-1H-pyrrole, 3-ethynyl-1H-pyrrole, 1-vinyl-1H-pyrrole-2,5-dione, 2-ethenyl-1H-pyrrole, 1-(prop-2-enyl)pyrrole, 1,3,4-tris(prop-2-enyl)pyrrole, 1H-pyrrole-1-carboxylic anhydride, acetic 1H-pyrrole-3-carboxylic anhydride, 1-prop-2-enylpyrrole-2,5-dione, 3-prop-2-enylpyrrole-2,5-dione, 3,4-bis(prop-2-enyl)pyrrole-2,5-dione, aniline, aniline (hydrochloride), 3-(trifluoromethyl)aniline, 2-nitroaniline, 4-cyano-3-(trifluoromethyl)aniline, aniline-2-sulfonic acid, and/or 4, 4'-methylenedianiline), or other monomer structures that can form conductive polymeric structures may be used as cathode additives for different types of cathode-based materials (such as Ni-rich NCA or NCM, Li-rich, $xLi_2MnO_3 \cdot (1-x)LiNi_aCo_bMn_cO_2$, Li-rich layered oxides, high-voltage spinel oxides, etc.) that are incorporated into Li-ion full cells with anodes containing Si. These materials may be incorporated as additives in the cathode active material slurry, by directly adding them into the electrolyte solution, and/or by dipping the prepared cathodes into solutions or suspensions that contain these materials. Therefore, the conductive polymer monomer additive(s) may be incorporated within the cathodes or on the surface of the cathodes. This may help improve structural stability and/or enhance the ionic conductivity and lifespan of the cathode materials. In addition, the conductive polymer monomers may help form a passivation layer on the surface of the cathodes, which not only hinders the formation of LiF, carbonates, and semicarbonate compounds but also renders the nature of the cathode electrolyte interphase layer formed during electrochemical cycles. It may be that incorporating the conductive polymer monomers may inhibit the dissolution of the active material into the electrolyte and preserve the initial atomic states including the active material bulk. Regardless of mechanism, the resulting unexpected effect achieved through incorporating the conductive polymer monomers into cathodes as described herein may be helpful to further improve the cycle performance and energy density of high-capacity, high-voltage cathode based Li-ion full cells with Si anodes. At the same time, these materials may also interact with the Si anode and contribute to the SEI composition and formation. And, as mentioned above, the conductive polymer monomer-containing additive may form electronically conductive interphase films, and be beneficial to the ionic conductivity of the interphase.

Figure 2:
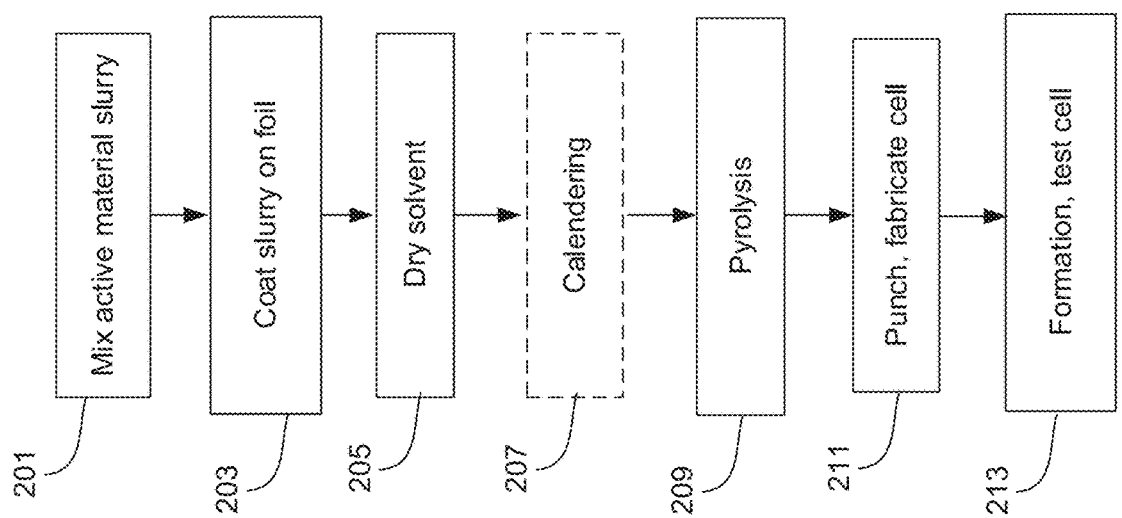
FIG. 2 is a flow diagram of a direct coating process for forming a cell with conductive polymer additive cathode, in accordance with an example embodiment of the disclosure.

FIG. 2 is a flow diagram of a direct coating process for forming a cell with conductive polymer monomer additive cathode, in accordance with an example embodiment of the disclosure. This process comprises physically mixing the active material, conductive polymer monomer additive, and binder together, and coating it directly on a current collector. This example process comprises a direct coating process in which an anode slurry is directly coated on a copper foil using a binder such as PVDF, CMC, SBR, Sodium Alginate, PAI, Poly(acrylic acid) (PAA), PI, LA133, polyvinyl alcohol (PVA), polyethylene glycol (PEG), Nafion solution, recently reported electronically conductive polymer binders, and mixtures and combinations thereof. Another example process comprising forming the active material on a substrate and then transferring to the current collector is described with respect to FIG. 3.

In step 201, the raw electrode active material may be mixed using a binder/resin (such as PI, PAI), solvent, and conductive carbon. For example, for the cathode, Super P/VGCF (1:1 by weight), or other types carbon materials, such as graphite, graphene, etc., may be dispersed in binder solution (mixture of NMP and PVDF) for 0.5 to 2 minutes at 1500-2500 rpm. NCA cathode material powder may be added to the mixture along with NMP solvent, then dispersed for another 1-3 minutes at 1500-2500 rpm to achieve a slurry viscosity within 2000-4000 cP (total solid content of about 48%). A conductive polymer monomer-based additive may be mixed in with the slurry at this point, or may be added at a later stage in the process. A similar process may be utilized to mix the active material slurry for the anode.

In step 203, the cathode slurry may be coated on an aluminum foil at a loading of, e.g., 15-35 mg/cm$^2$. Similarly, the anode slurry may be coated on a copper foil at a loading of 3-6 mg/cm$^2$, which may undergo drying in step 205 resulting in less than 13-20% residual solvent content. In another example scenario, a conductive polymer monomer-based additive may be incorporated by dipping the coated foil in a solution or suspension containing the desired conductive polymer monomer additive(s).

In step 207, an optional calendering process may be utilized where a series of hard pressure rollers may be used to finish the film/substrate into a smoother and denser sheet of material.

In step 209, the active material (i.e., electrode coating layer) may be pyrolyzed by heating to 500-1200° C. such that carbon precursors are partially or completely converted into glassy carbon. Pyrolysis can be done either in roll form or after punching in step 211. If done in roll form, the punching is done after the pyrolysis process. The punched electrode may then be sandwiched with a separator and cathode with electrolyte to form a cell. If the conductive polymer monomer-based additive has not been incorporated up to this point, it may be added after pyrolysis in the cell fabrication process as an electrolyte additive, for example. In step 213, the cell may be subjected to a formation process, comprising initial charge and discharge steps to lithiate the anode, with some residual lithium remaining and cell testing to determine performance.

Figure 3:
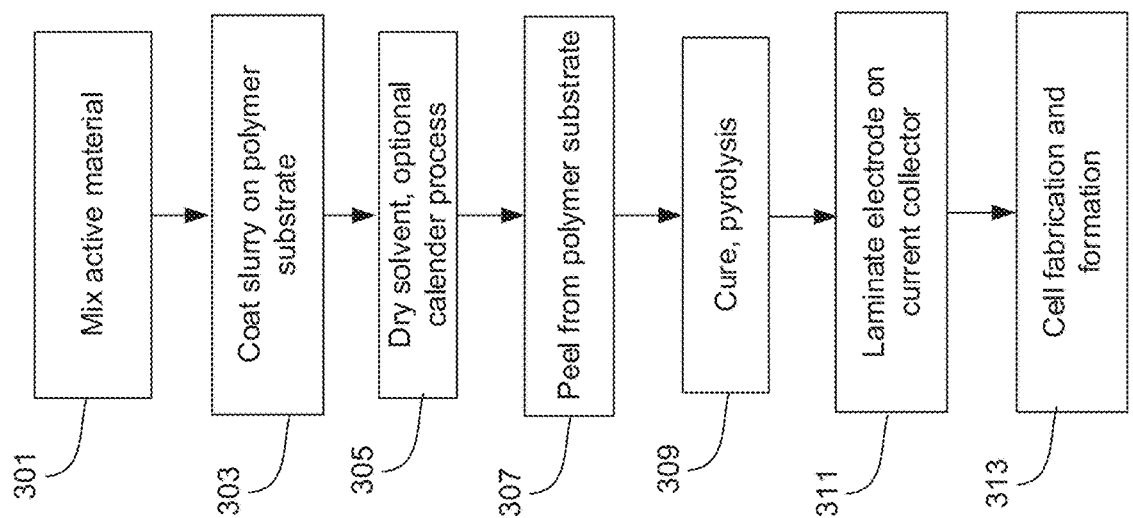
FIG. 3 is a flow diagram of an alternative process for lamination of electrodes, in accordance with an example embodiment of the disclosure.

FIG. 3 is a flow diagram of an alternative process for lamination of electrodes, in accordance with an example embodiment of the disclosure. While the previous process to fabricate composite electrodes (e.g., cathodes, anodes) employs a direct coating process, this process physically mixes the active material, conductive additive, and binder together coupled with peeling and lamination processes.

This process is shown in the flow diagram of FIG. 3, starting with step 301 where the raw electrode active material may be mixed using a binder/resin (such as PI, PAI), solvent, and conductive carbon. For example, for the cathode, Super P/VGCF (1:1 by weight) may be dispersed in binder solution (mixture of NMP and PVDF) for 0.5 to 2 minutes at 1500-2500 rpm. NCM, NCA, Li-rich or other cathode material powder may be added to the mixture along with NMP solvent, then dispersed for another 1-3 minutes at 1500-2500 rpm to achieve a slurry viscosity within 2000-4000 cP (total solid content of about 48%). A conductive polymer monomer-based additive may be mixed in with the slurry at this point, or may be added at a later stage in the process. A similar process may be utilized to mix the active material slurry for the anode.

In step 303, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ (with 13-20% solvent content) for the anode and 15-35 mg/cm$^2$ for the cathode, and then dried to remove a portion of the solvent in step 305. In another example scenario, a conductive polymer monomer-based additive may be incorporated by dipping the green layer coated substrate in a solution or suspension containing the desired conductive polymer monomer(s). An optional calendering process may be utilized where a series of hard pressure rollers may be used to finish the film/substrate into a smoothed and denser sheet of material.

In step 307, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 309 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 311, the pyrolyzed material may be flat press or roll press laminated on the current collector, where for aluminum foil for the cathode and copper foil for the anode may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film (i.e., electrode coating layer) may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector. In yet another example scenario, a conductive polymer monomer-based additive may be incorporated by dipping the coated foil in a solution or suspension containing the desired conductive polymer monomer(s).

In step 313, the electrodes may then be sandwiched with a separator and electrolyte to form a cell. If the conductive polymer monomer-based additive has not been incorporated up to this point, it may be added after pyrolysis in the cell fabrication process as an electrolyte additive, for example. The cell may be subjected to a formation process, comprising initial charge and discharge steps to lithiate the anode, with some residual lithium remaining, and testing to assess cell performance.

As illustrated in the disclosure and example embodiments below, preparing a cathode (and a battery incorporating such a cathode) with an additive comprising at least one conductive polymer monomer provides several advantages. For example, incorporating an amount of at least one conductive polymer monomer additive into the cathode manufacturing process can provide a battery having increased cycle lifespan, increased safety, increased thermal stability of the electrolyte, enhanced high temperature performance of the battery cells, decreased electrolyte consumption/degradation, and decreased impedance increase in electrode interfaces.

In accordance with the disclosure, solutions and/or suspensions in solvents, (e.g., organic solvents) containing at least one conductive polymer monomer and/or mixtures thereof, are prepared and are capable of being incorporated in the manufacture of cathodes, and battery cells including such cathodes.

In an example scenario, one or more conductive polymer monomers may be used as a cathode additive to improve cycle performance of $Li[Ni_xCo_yAl_{1-x-y}]O_2$ (NCA) or $Li[Ni_x Co_yMn_{1-x-y}]O_2$ (NCM) (including NCM811, NCM622, NCM532, NCM442, NCM111, etc.) and other cathode active materials described herein, that are incorporated into cathode-based Li-ion full cells with all other types of Si anodes. Furthermore, one or more conductive polymer monomers as described herein may be used as a cathode additive to improve cycle performance for LCO and/or LMO cathode-based full cells with different Si anodes. In example embodiments at least one conductive polymer monomer selected from thiophene-based monomers, pyrrole-based monomers, and/or aniline-based monomers may also be utilized as a cathode additive to improve cycle performance for Li-rich, $xLi_2MnO_3 \cdot (1-x)LiNi_aCo_bMn_cO_2$ cathode-based full cells with different Si anodes, as well as for a cathode additive to improve cycle performance for Ni-rich layered oxides ($LiNi_{1-x}M_xO_2$, where M=Co, Mn, and Al)-based Li-ion full cells with different Si anodes. In another example, conductive polymer monomers may be used as a cathode additive to improve cycle performance for Li-rich layered oxides ($LiNi_{1+x}M_{1-x}O_2$, where M=Co, Mn, and Ni)-based Li-ion full cells with different Si anodes. In yet another example, conductive polymer monomers may be used as a cathode additive to improve cycle performance for high-voltage spinel oxides ($LiNi_{0.5}Mn_{1.5}O_4$) cathode Li-ion full cells with different Si anodes.

Conductive polymer monomers may also be used as a cathode additive to improve cycle performance for high-voltage polyanionic compounds (phosphates, sulfates, silicates, etc.) cathode-based Li-ion full cells with different anodes, including Si and Si-dominant anodes. The conductive polymer monomers as incorporated in any of the above examples may be selected from any type of monomer that, upon polymerization, forms a conductive polymer structure, including the example embodiments of thiophene-, pyrrole-, and aniline-based monomer that are described herein. Such example embodiments of conductive polymer monomers may be utilized as a cathode additive to improve cycle performance of all of the aforementioned cathode-based Li-ion full cells with different Si anodes.

In another example scenario, intermediates, including reactive intermediates/free radicals, partially polymerized materials, and the like, derived from one or more conductive polymer monomers (e.g., precursors of, or partially reacted/polymerized forms of thiophene, pyrrole, and aniline monomers, etc.) or other conductive polymer monomer-containing materials or precursor materials may be utilized as a cathode additive to improve cycle performance of all of the aforementioned cathode-based Li-ion full cells with different Si anodes.

Each of the aforementioned materials may be incorporated in a cathode active material slurry, or deposited on a cathode active material (i.e., electrode coating layer) after being formed on a substrate or foil, by dipping in a second slurry or depositing with other layer deposition techniques. The conductive polymer monomer additive may comprise 5% or less of the cathode active material (e.g., 5.0%, 4.5%, 4.0%, 3.5%, 3.0%, 2.5%, 2.0%, 1.5%, 1.0%, 0.5%, 0.25%, or 0.1%) by weight. In another example embodiment, the conductive polymer monomer additive may comprise 2% (wt) or less of the cathode active material. In yet another example, the conductive polymer monomer-containing additive may comprise 1% (wt) or less of the cathode active material.

A conductive polymer monomer-containing additive-based solution may be utilized to directly coat or incorporate the polymer monomer(s) into cathode active material (i.e., electrode coating layer). The solvent in the solution may comprise any solvent that is capable of solubilizing or dispersing at least a portion of the conductive polymer monomer in solution. Some example embodiments of a solvent may include common organic solvents such as, for example, alcohols, ethers, aromatic solvents, $CS_2$, cyclohexane, toluene or other similar solvents.

The anodes used with the conductive polymer monomer-additive cathodes disclosed here may comprise >50% silicon in the active material and heat-treated to above 300 degrees Celsius. In another example scenario, the anodes may comprise >25% silicon in the active material and heat-treated to above 300 degrees Celsius. In yet another example scenario, the anodes may comprise >50% silicon in the active material and heat-treated to above 400 degrees Celsius.

In an example embodiment of the disclosure, a method and system are described for conductive polymer monomer-containing chemicals as cathode additives for silicon-based lithium ion batteries. The battery may comprise a silicon-based anode, an electrolyte, and a cathode. The cathode may comprise an active material and a conductive polymer monomer-containing additive. The cathode active material may comprise one or more of nickel cobalt aluminum oxide (NCA), nickel cobalt manganese oxide (NCM) including, for example, Ni-rich NCM90 (9,0.5,0.5), NCM811, NCM622, NCM532, NCM442, NCM333, NCMA, lithium iron phosphate (LFP), lithium cobalt oxide (LCO), and lithium manganese oxide (LMO), Ni-rich layered oxides ($LiNi_{1-x}M_xO_2$, where M=Co, Mn, or Al), Li-rich $xLi_2MnO_3 \cdot (1-x)LiNi_aCo_bMn_cO_2$, Li-rich layered oxides ($LiNi_{1+x}M_{1-x}O_2$, where M=Co, Mn, or Ni), high-voltage spinel oxides ($LiNi_{0.5}Mn_{1.5}O_4$), high-voltage polyanionic compounds including, for example, phosphates, sulfates, silicates, and the like, as well as other cathode materials.

In example embodiments, the pyrrole-based monomer that may be added to the cathode may comprise any one or more pyrrole monomer(s) that can polymerize to form a conductive polymer structure. In some example embodiments the pyrrole-based monomer may be polymerized under oxidizing conditions to form a conductive polymer. In some example embodiments the pyrrole-based monomer may be polymerized under reducing conditions to form a conductive polymer. In some example embodiments the pyrrole-based monomer may be selected from one or more of the monomers in Table 1.

TABLE 1

Example embodiments of pyrrole-based monomers.

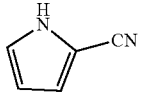

1H-pyrrole-2-carbonitrile

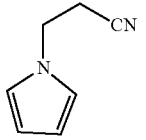

1-(2-cyanoethyl)pyrrole
(CEP)

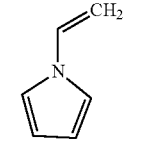

1-ethenyl-1H-pyrrole

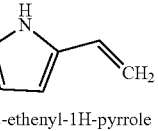

2-ethenyl-1H-pyrrole

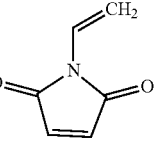

1-vinyl-1H-pyrrole-2,5-dione

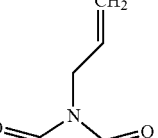

1-prop-2-enylpyrrole-2,5-dione

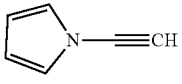

1-ethynyl-1H-pyrrole

3-ethynyl-1H-pyrrole

TABLE 1-continued

Example embodiments of pyrrole-based monomers.

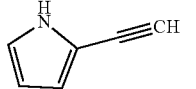

2-ethynyl-1H-pyrrole

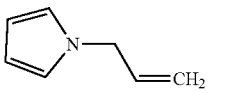

1-(prop-2-enyl)pyrrole

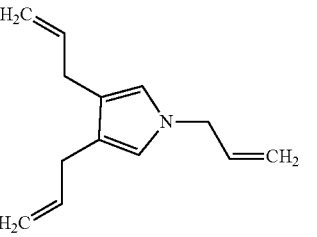

1,3,4-tris(prop-2-enyl)pyrrole

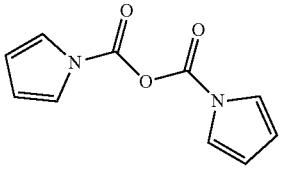

1H-pyrrole-1-carboxylic anhydride

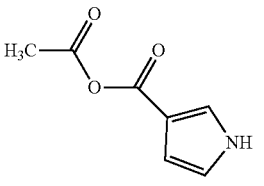

Acetic-1H-pyrrole-3-carboxylic anhydride

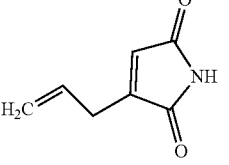

3-prop-2-enylpyrrole-2,5-dione

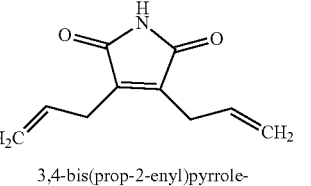

3,4-bis(prop-2-enyl)pyrrole-2,5-dione

In example embodiments, the aniline-based monomer that may be added to the cathode may comprise any one or more aniline monomer(s) that can polymerize to form a conductive polymer structure. In some example embodiments the aniline-based monomer may be polymerized under oxidizing conditions to form a conductive polymer. In some example embodiments the aniline-based monomer may be polymerized under reducing conditions to form a conductive polymer. In some example embodiments the aniline-based monomer may be selected from one or more of the monomers in Table 2.

TABLE 2

Example embodiments of aniline-based monomers.

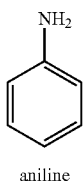

aniline

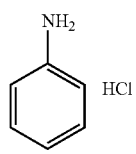

Aniline hydrochloride

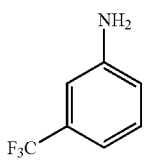

2-(trifluoromethyl)aniline

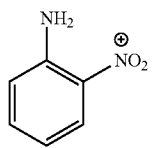

2-nitroaniline

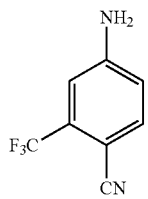

4-cyano-3-(trifluoromethyl)aniline

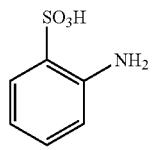

Aniline-2-sulfonic acid

TABLE 2-continued

Example embodiments of aniline-based monomers.

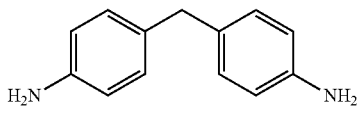

4,4'-methylenedianiline

In example embodiments, the thiophene-based monomer that may be added to the cathode may comprise any one or more thiophene monomer(s) that can polymerize to form a conductive polymer structure. In some example embodiments the thiophene-based monomer may be polymerized under oxidizing conditions to form a conductive polymer. In some example embodiments the thiophene-based monomer may be polymerized under reducing conditions to form a conductive polymer. In some example embodiments the thiophene-based monomer may be selected from one or more of the monomers in Table 3.

TABLE 3

Example embodiments of thiophene-based monomers.

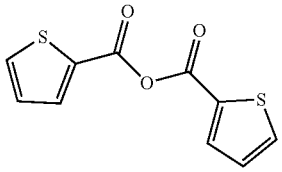

Thiophene-2-carboxylic anhydride (TCA)

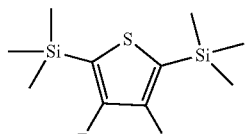

3,4,-difluoro-2,5-bis(trimethylsilyl)thiophene (DFBTST)

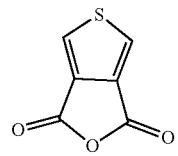

3,4,-thiophenedicarboxylic anhydride (TDCA)

Accordingly, the conductive polymer monomer additive may comprise one or more of pyrrole-based, aniline-based, and thiophene-based monomers, including the example monomers described above. The conductive polymer monomer-containing additive may comprise 5% or less by weight of the active material, or 1% or less by weight of the active material.

As described above, example embodiments in accordance with the disclosure provide a cathode that may include the conductive polymer monomer-containing additive, or combinations thereof, as described herein. Other example embodiments in accordance with the disclosure, provide an anode that may include the conductive polymer monomer-containing additive, or combinations thereof, as described herein. As described herein in such example embodiments, the anode may comprise an active material that comprises between 50% to 95% silicon. Yet other example embodiments in accordance with the disclosure, provide an electrolyte that may include the conductive polymer monomer-containing additive, or combinations thereof, as described herein. In such example embodiments, the electrolyte such as the example electrolytes disclosed herein may comprise a liquid, solid, or gel, or combinations thereof. Thus, the example embodiments described herein provide for a battery, or one or more battery components that may include the conductive polymer monomer-containing additive, or combinations thereof, as described herein. In example embodiments, the battery may comprise a lithium ion battery.

An electrolyte composition may be prepared in accordance with the disclosure. As an example embodiment, one or more conductive polymer monomers may be included in an electrolyte by adding such monomer(s) at about 0.5 wt % or 1 wt % or more (e.g., up to about 5 wt %) to the electrolyte such as, for example, an electrolyte that may comprise 1.2M $LiPF_6$ in FEC/EMC (3/7 wt %). In such example embodiments, amounts of one or more conductive polymer monomer additives may be added and may include from about 0.5% to about 1.0% (wt) of one or more additives, such as 3,4-thiophenedicarboxylic anhydride (TDCA), thiophene-2-carboxylic anhydride (TCA), 3,4-difluoro-2,5-bis(trimethylsilyl)thiophene (DFBTST), and 1-(2-cyanoethyl) pyrrole (CEP), or any combination thereof. The additive-containing electrolyte may be incorporated into cells such as, for example, half or full cells, or a battery that may be constructed with an anode (e.g., Si-dominant anode) and a cathode (e.g., NCM811) and may be tested at about 1 C/0.5 C charge/discharge processes with a working voltage window of about 4.2V to 3.1V.

In accordance with some example embodiments of the disclosure, the functional conductive polymer monomer-containing additives may be used as part of a Li-ion battery. In some embodiments, the conductive polymer monomer-containing additives may be part of an electrode, such as part of a cathode or Si-containing (e.g., Si dominant) anode. In other example embodiments, the conductive polymer monomer-containing additives may be used, alone or in any combination with each other, as an additive for an electrolyte. In accordance with the disclosure, some example embodiments provide for soluble conductive polymer monomer-containing additives that may be incorporated as an electrolyte additive, and for insoluble conductive polymer monomer-containing additives that may be used as part of an electrode, or as an insoluble electrolyte additive. In some example embodiments a combination of conductive polymer monomer additives can be incorporated including, for example, a combination of soluble and insoluble conductive polymer monomer additives. Procedures for incorporating electrolyte additives in a Li-ion battery suitable for use with the present invention include known processes, as well as the processes described in co-pending U.S. patent application Ser. No. 16/430,302 (filed Jun. 3, 2019), Ser. No. 16/430,298 (filed Jun. 3, 2019), and Ser. No. 16/722,746 (filed Dec. 20, 2019), as well as U.S. provisional patent application Ser. Nos.: 62/857,700 (filed Jun. 5, 2019) and 62/857,742 (filed Jun. 5, 2019) each of which is hereby incorporated herein by reference in their entirety.

Figure 4:
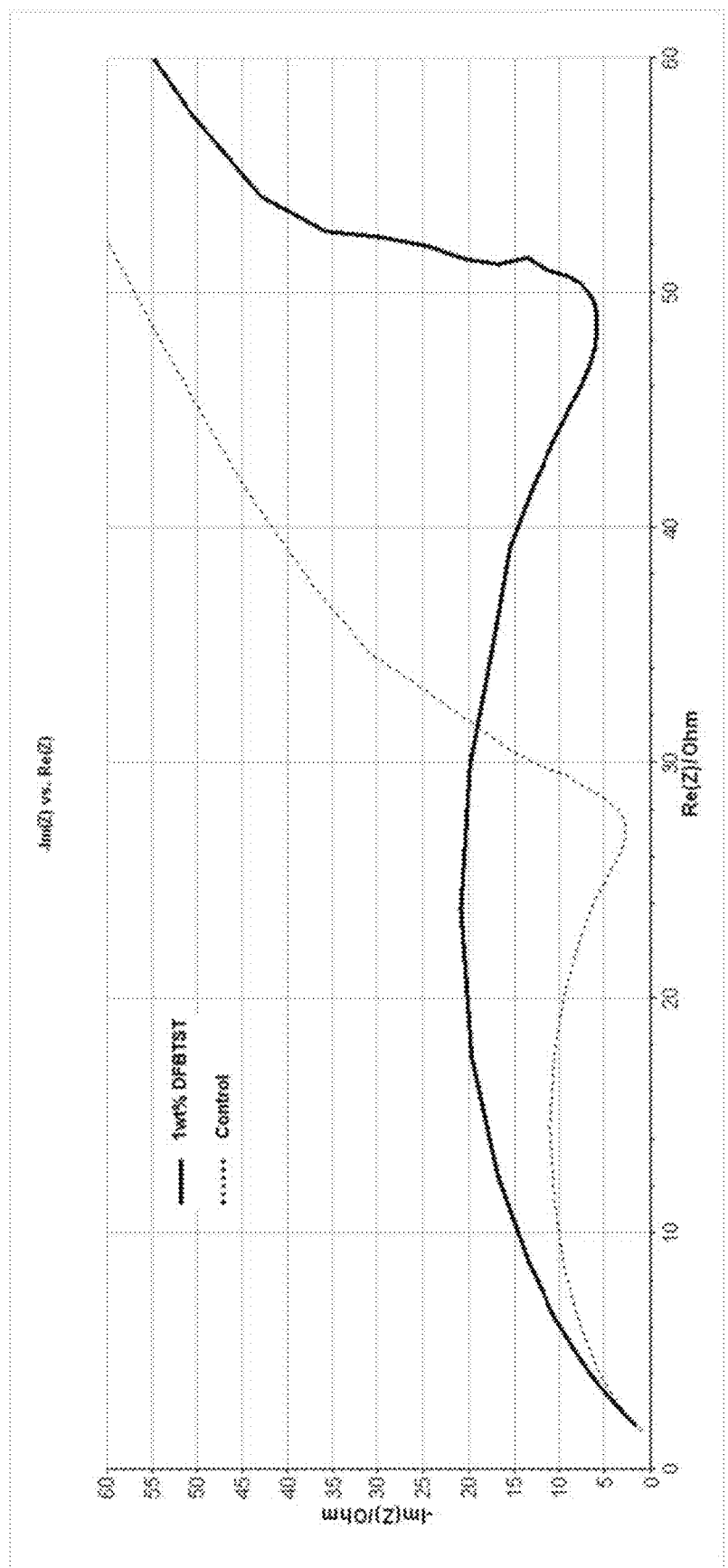
FIG. 4 illustrates Nyquist plots ($-Z''$ vs $Z'$) of cathode-based coin half cells without (control) and with polymer monomer additive, in accordance with an example embodiment of the disclosure.

A cathode may be prepared in accordance with the disclosure. For example, 3,4-difluoro-2,5-bis(trimethylsilyl) thiophene (DFBTST) may be incorporated into the manufacturing process of a cathode, such as NCM811, and added at about 1% by weight of the active material in accordance with an example embodiment of the disclosure. FIG. 4 illustrates a Nyquist plot (−Z" vs Z') overlay of a control NCM811 cathode (dotted lines) and a NCM811 cathode comprising 1% DFBTST (solid line). Referring to FIG. 4, it is shown that initial cell resistance of both cells show different values. Compared to the control, the cathode in accordance with an example embodiment of the disclosure shows about 50 ohms of charge transfer resistance, which is significantly higher than the control.

Figure 5A:
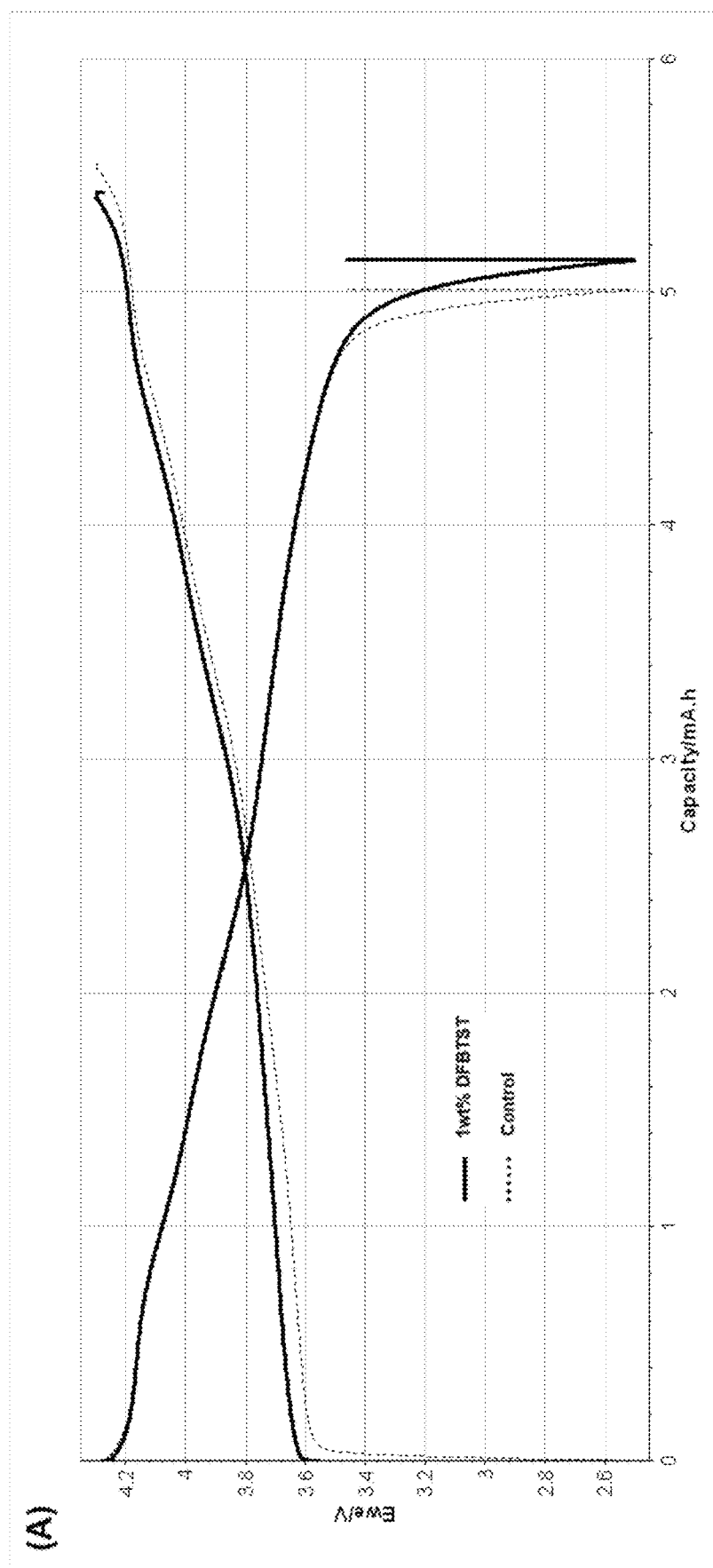
FIGS. 5A-5J illustrates galvanostatic charge-discharge profiles of cathode-based coin half cells without (control) and with polymer monomer additive, in accordance with an example embodiment of the disclosure.
Figure 5B:
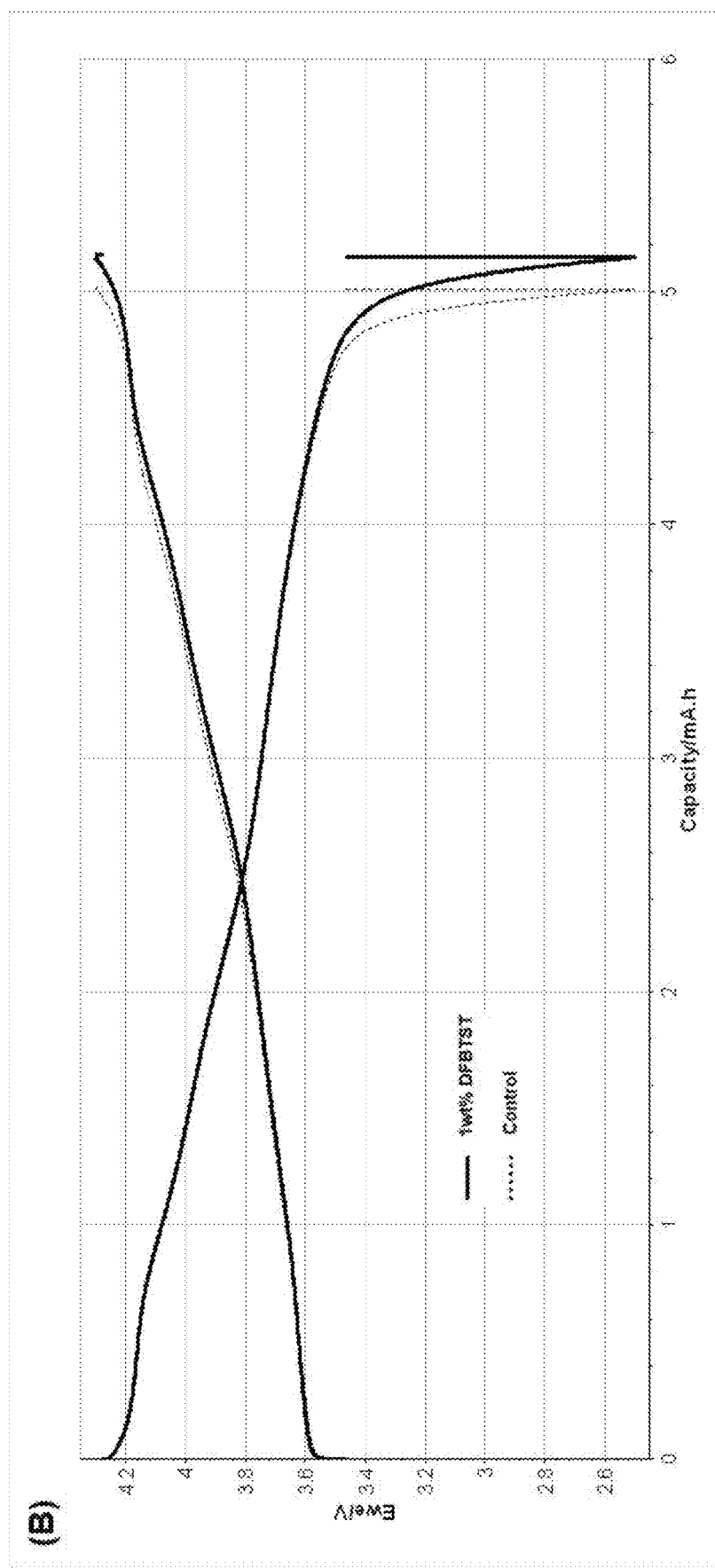
Figure 5C:
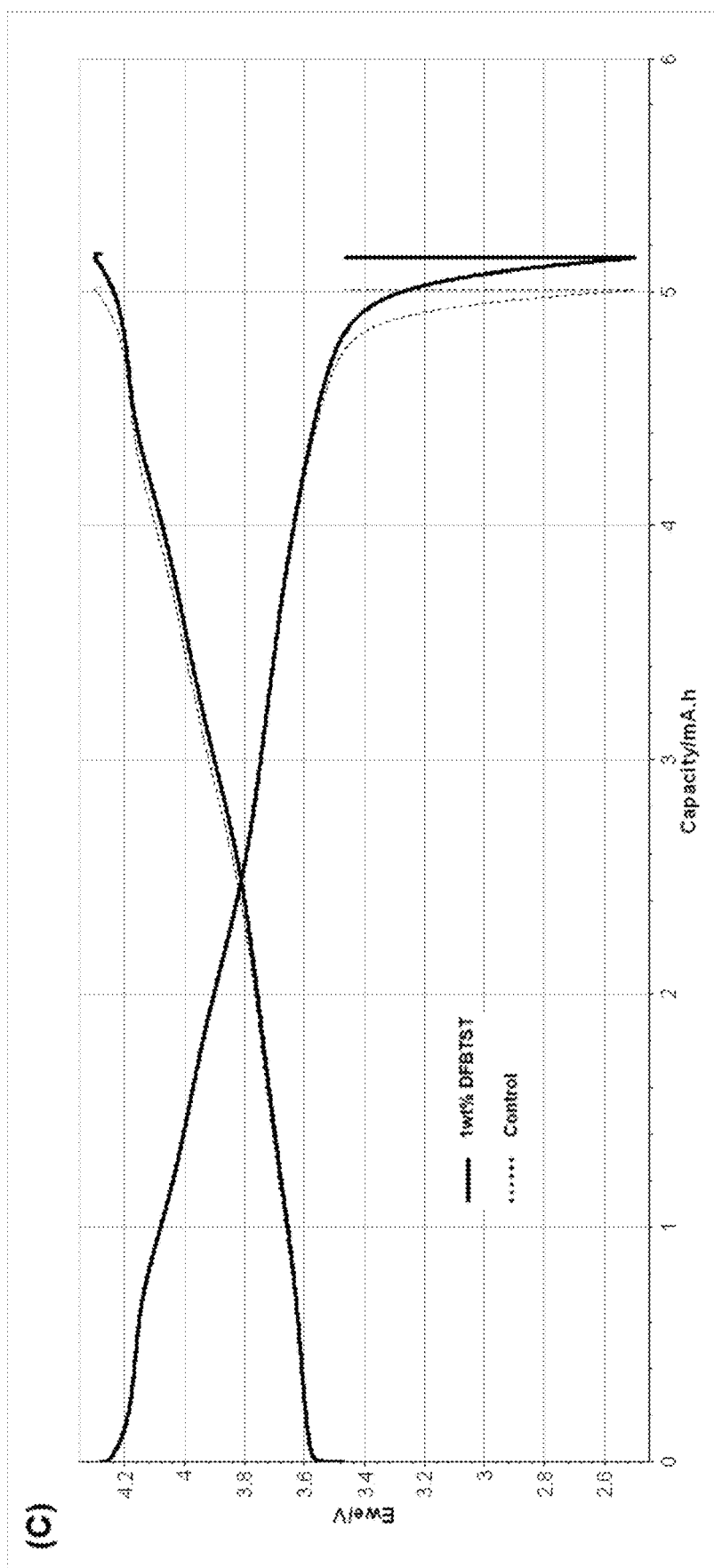
Figure 5D:
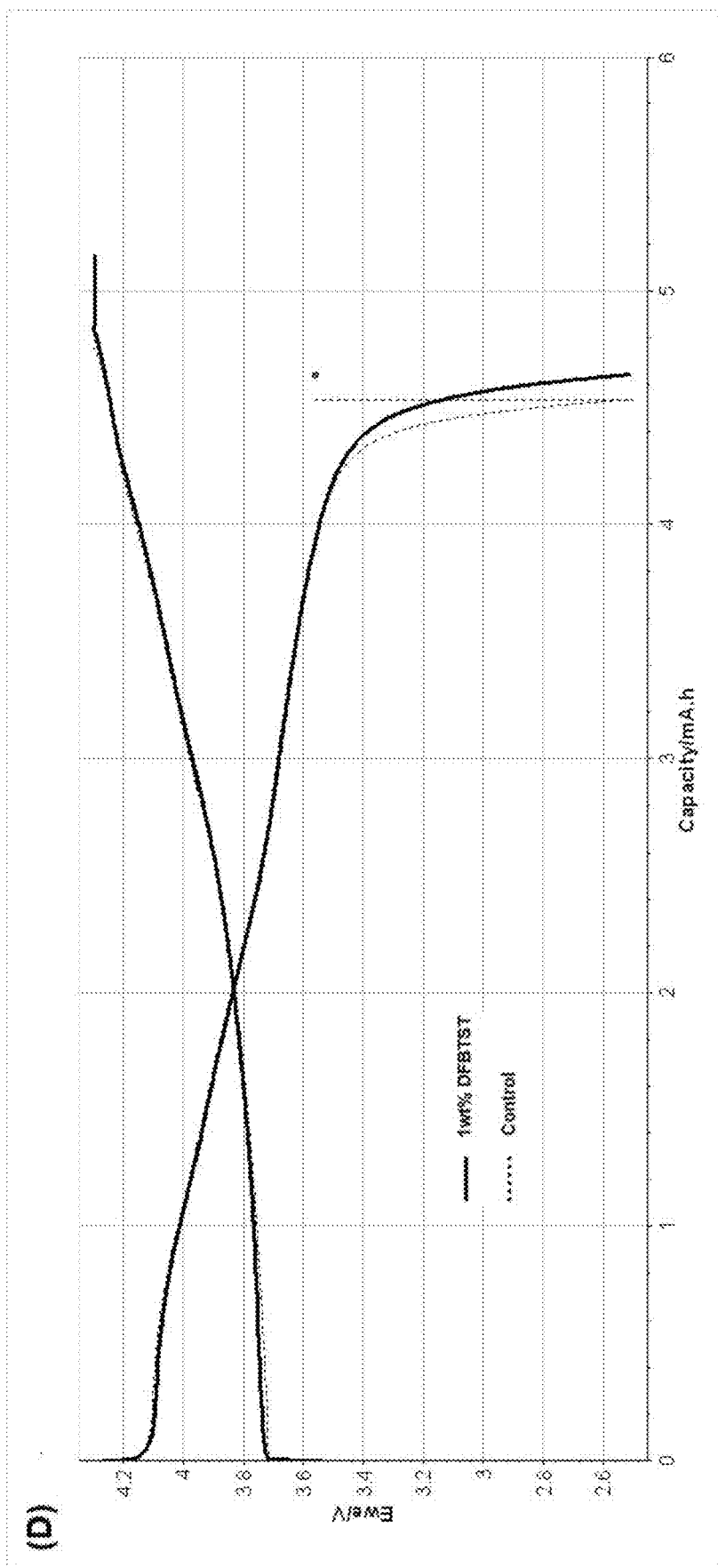
Figure 5E:
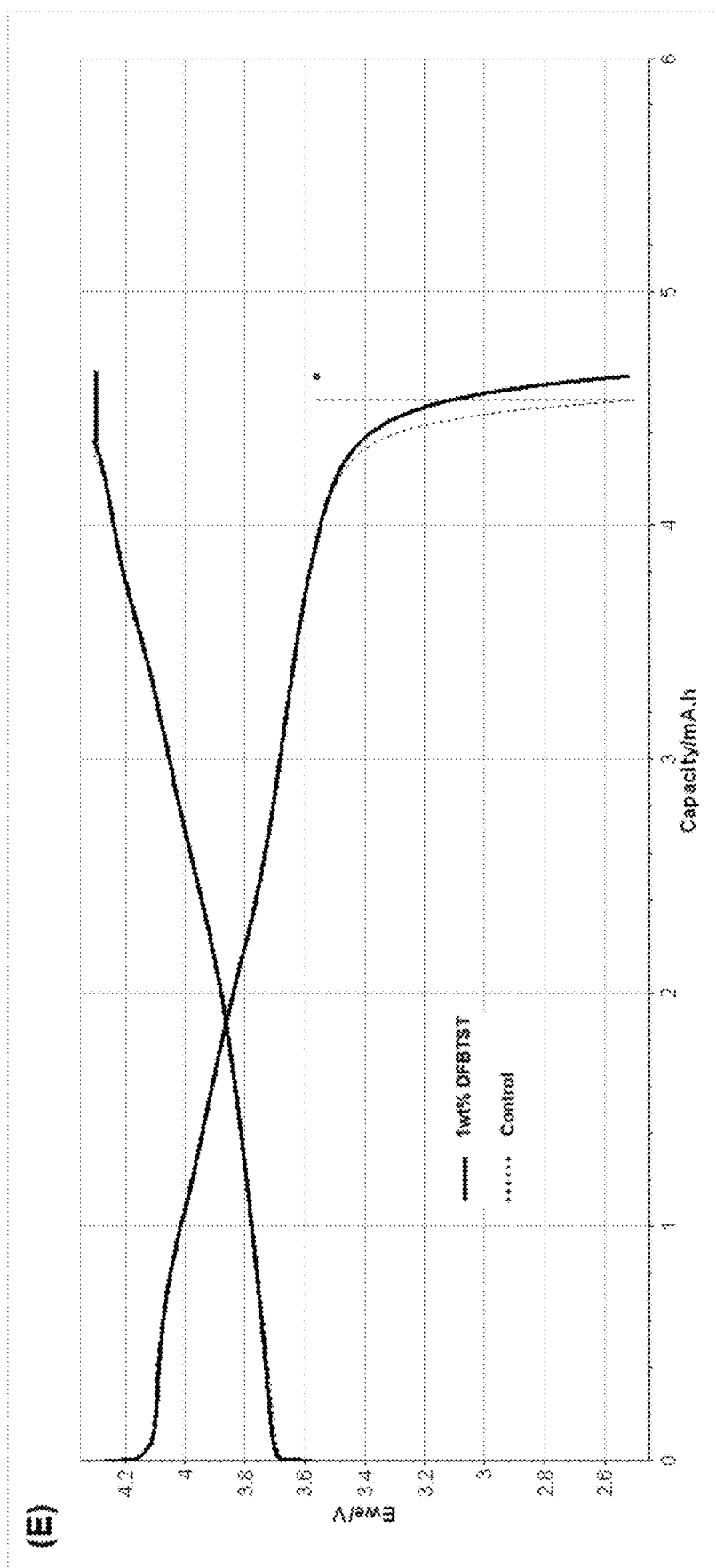
Figure 5F:
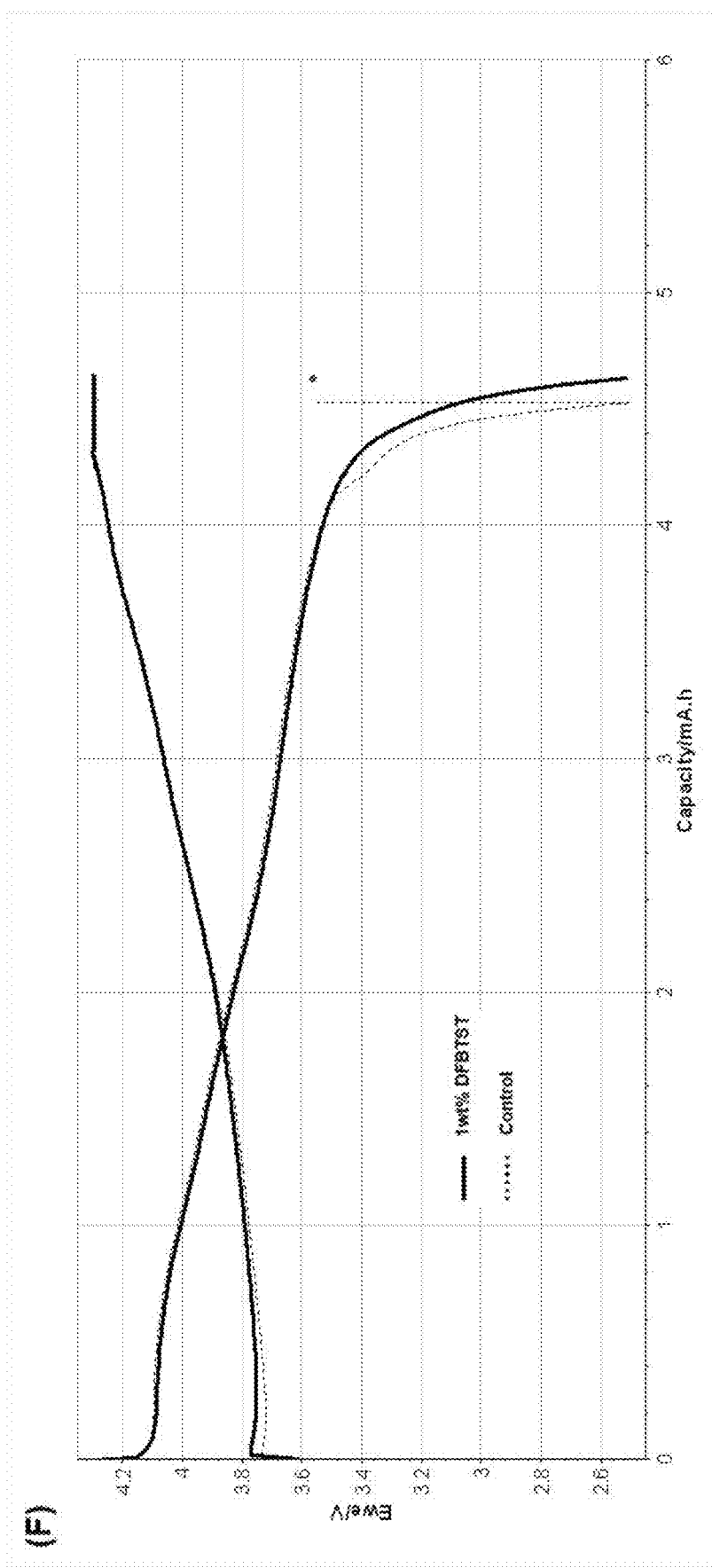
Figure 5G:
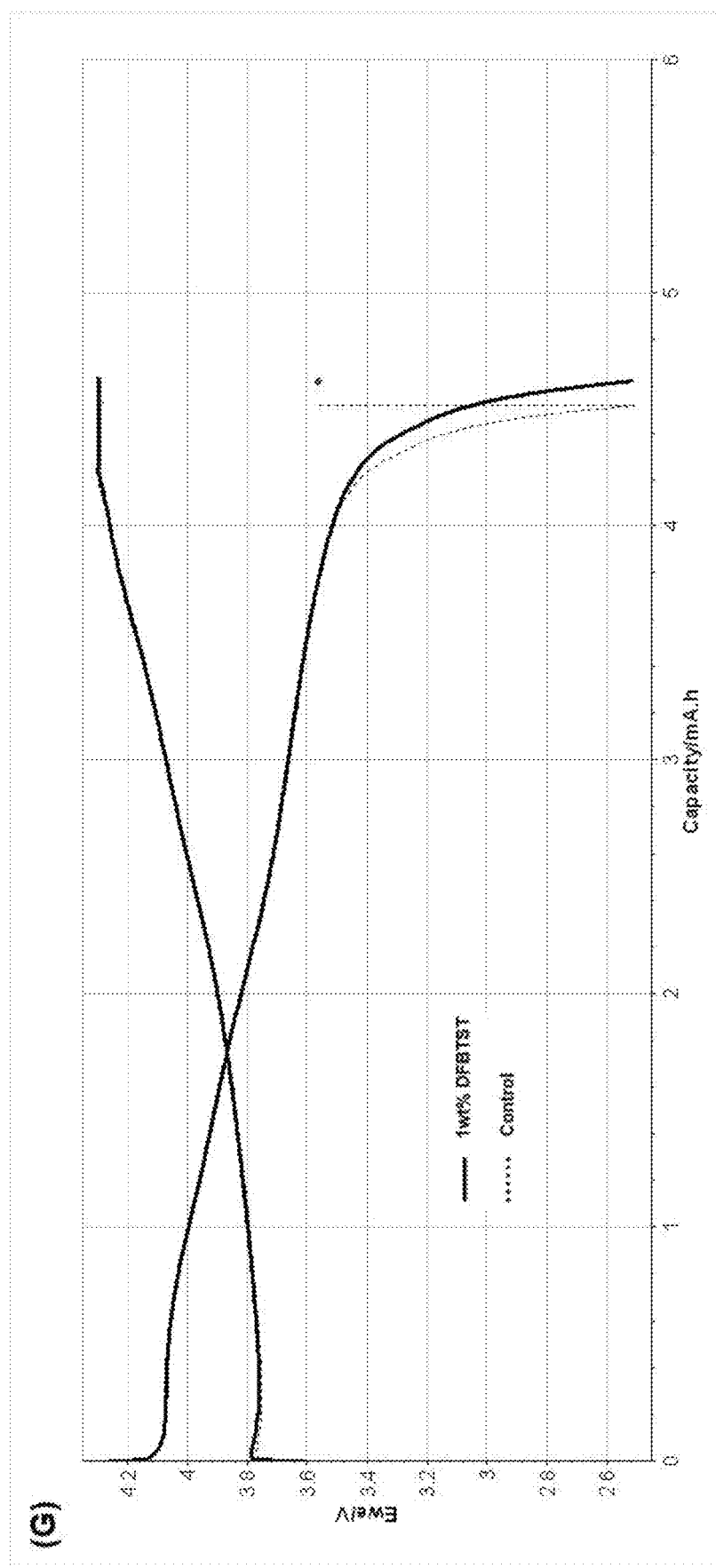
Figure 5H:
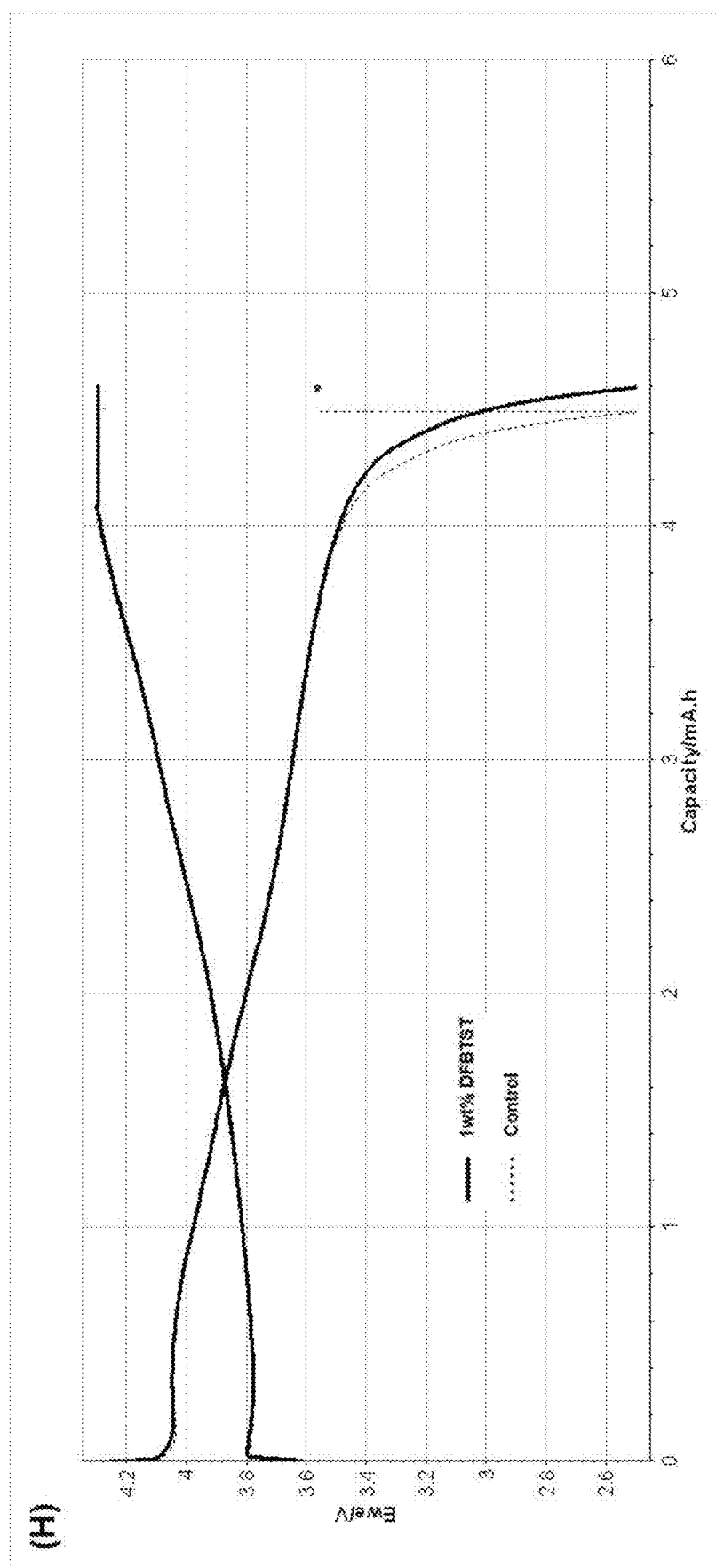
Figure 5I:
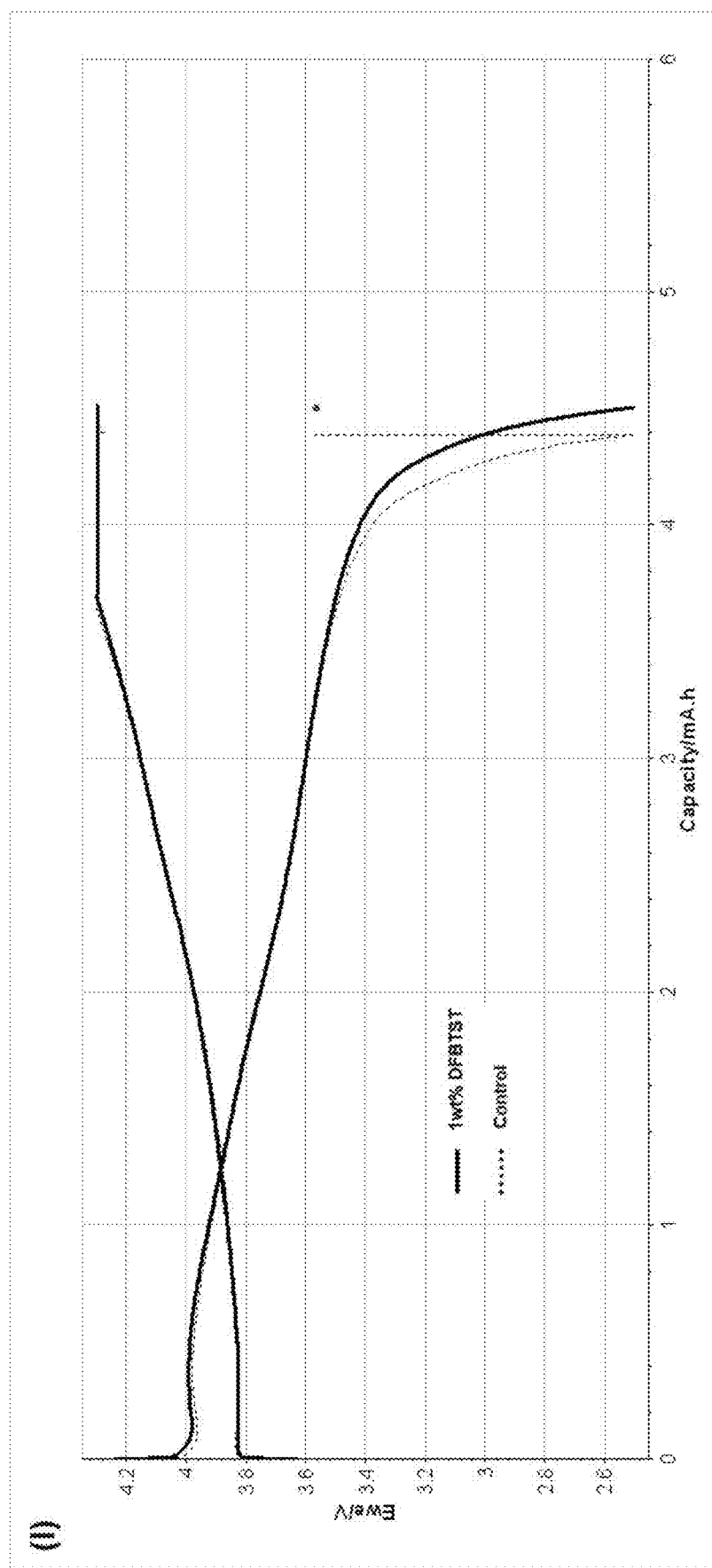
Figure 5J:
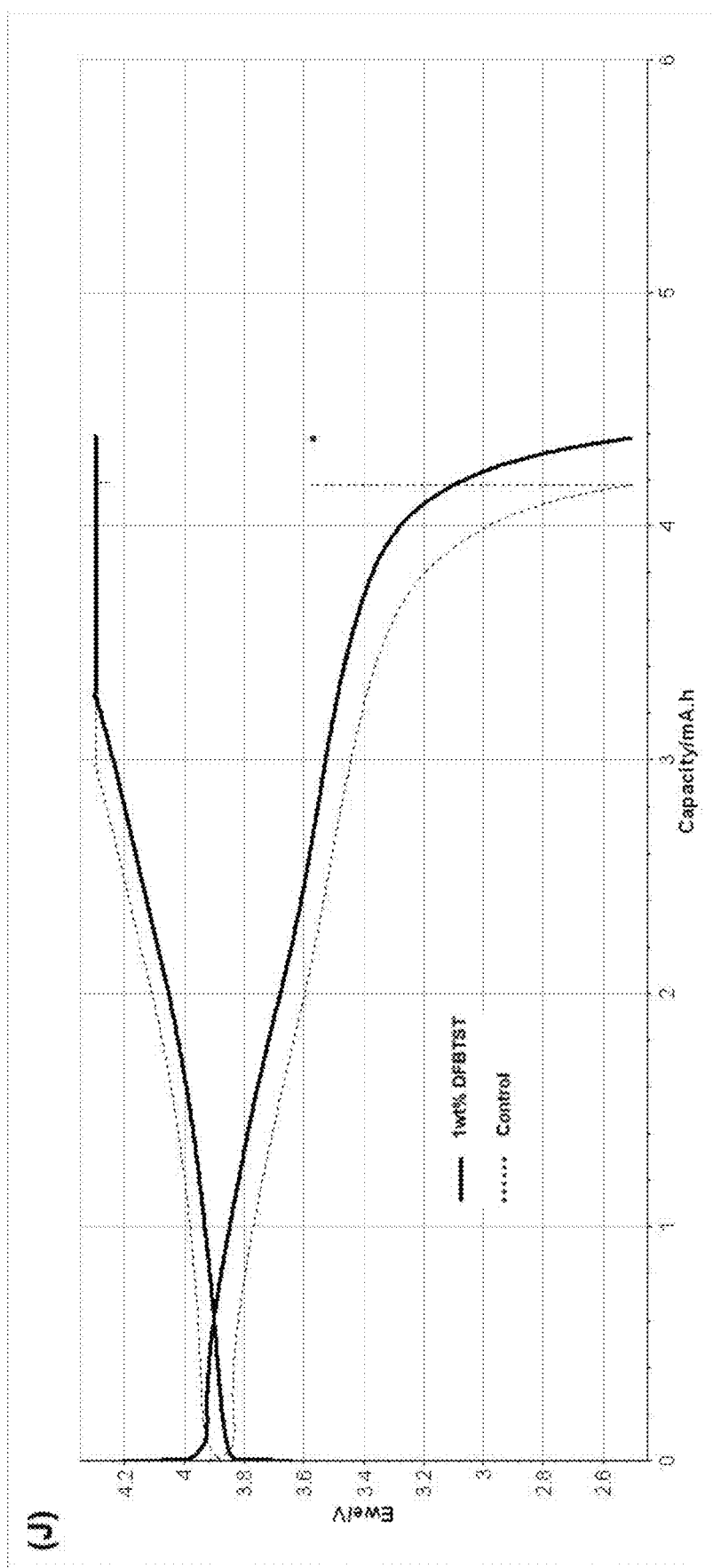

FIGS. 5A-5J further characterize the performance of the cathode in accordance with an example embodiment of the disclosure. FIGS. 5A-5J illustrate galvanostatic charge-discharge profiles for half type coin cells for each of the control NCM811 cathode (dotted line in each FIG. 5A-J) and the example embodiment NCM811 cathode with ~1% wt added DFBTST (solid line in each FIG. 5A-J). FIGS. 5A-5C depict the galvanostatic charge-discharge profiles for the half type coin cells at a current rate of 0.1 C between 2.5-4.3 V for 3 cycles. FIGS. 5D-5J depict the further galvanostatic charge-discharge profiles for the half type coin cells running at 1 C between 2.5-4.3 V for another 100 cycles. In particular, the $1^{st}$, $2^{nd}$, $5^{th}$, $10^{th}$, $20^{th}$, $50^{th}$, and $100^{th}$ cycle galvanostatic charge-discharge profiles at 1 C rate are shown in FIGS. 5D-5J, respectively. In accordance with an example embodiment of the disclosure, the electrolyte formulation is 1.2 M $LiPF_6$ in FEC/EMC (3/7 wt %). The control cathode may contain about 92 wt % NCM811, 4 wt % Super P and 4 wt % PVDF5130, and are coated on 15 μm Al foil. The average loading is about 22 mg/cm$^2$. In some example embodiments, the cathodes may contain 1 wt % Al-MCM-41-containing NCM811 cathodes that contain about 91 wt % NCM811, 1 wt % Al-MCM-41, 4 wt % Super P and 4 wt % PVDF5130, and are also coated on 15 μm Al foil with a similar loading with control.

FIGS. 5A-5C show that at the initial activation step, the NCM811 control cathode-based half cell has a slightly higher charge capacity than the 1 wt % DFBTST-containing NCM811 cathode example embodiment of the disclosure. At the first activation cycle, however, the discharge capacity of the control is lower than the DFBTST-containing example embodiment. As a result, the control cells have slightly lower discharge capacity than the DFBTST-containing example embodiment at the $2^{nd}$ and the $3^{rd}$ cycles at the activation step. When cycling the cells at 1 C, the control cell still exhibits a slightly lower capacity but similar polarization/overpotential for more than 50 cycles (FIG. 5D-5I). When cycled to the $100^{th}$ cycle (FIG. 5J), the 1 wt % DFBTST-containing cell shows higher capacity and lower polarization/overpotential than the control cells. This illustrative embodiment of an example cathode in accordance with the disclosure indicates that conductive polymer monomer additive (e.g., DFBTST) incorporated into cathode active material (e.g., NCM811) can effectively suppress the dissolution of transition metal ions from the cathode surface, minimize depositing of transition metal ions on the surface Li metal, improve the interfacial stability of cathodes, such as Ni-rich cathodes, and reduce the overpotential of the electrode. These benefits lead to improvement in the cycle performance.

Figure 6:
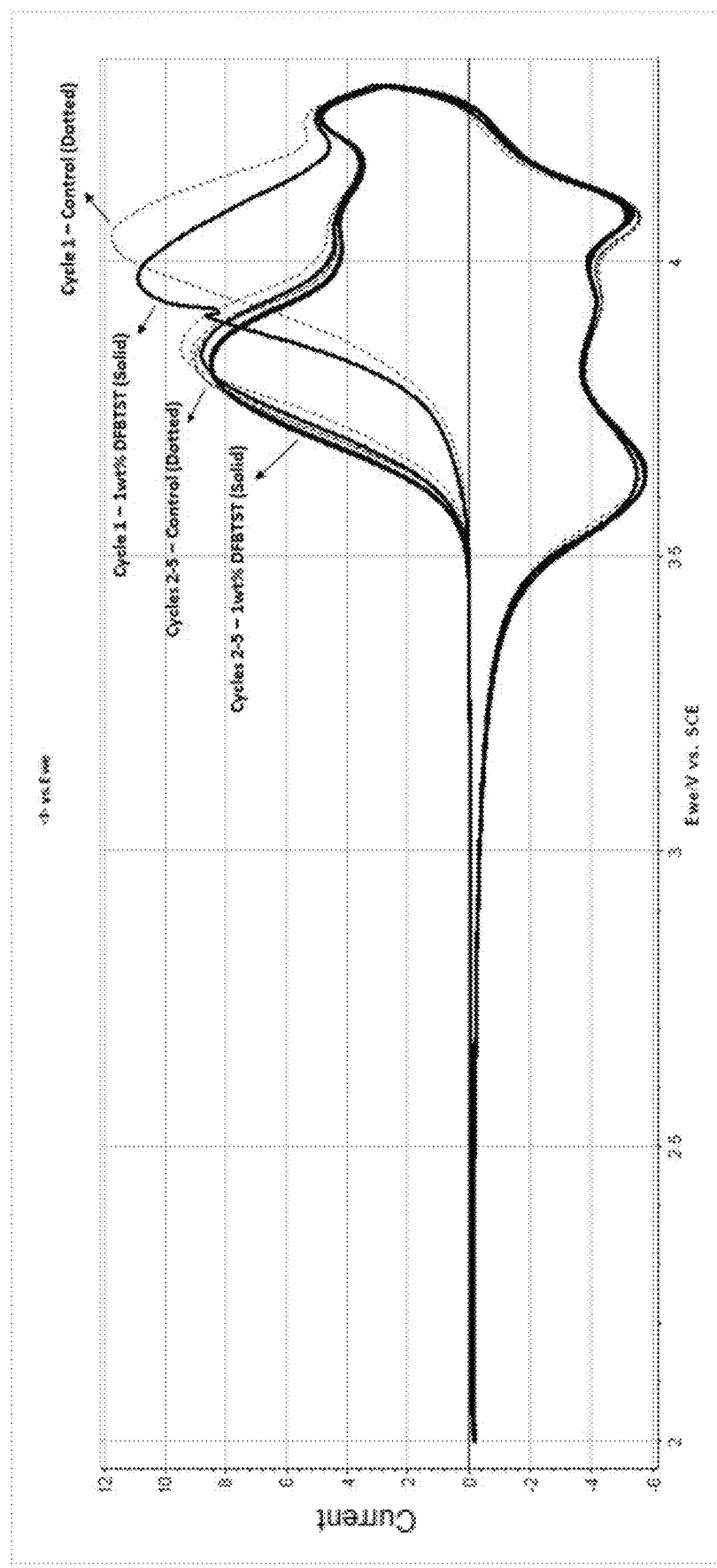
FIG. 6 illustrates a cyclic voltammetry (CV) trace for cathode-based coin half cells without (control) and with polymer monomer additive, in accordance with an example embodiment of the disclosure.

Referring to FIG. 6, there is shown cyclic voltammetry curves with dotted lines for control cathodes, without conductive polymer monomer additive, and solid lines for cathodes with 1.0% conductive polymer monomer additive (DFBTST), both using NCM811. The plot shows potentials of the anode and cathode with respect to a saturated calomel electrode (SCE) at different cell current in milliamps. The electrolyte formulation may comprise 1.2 M LiPF$_6$ in FEC/EMC (3/7 wt %). In this example embodiment, the Si-dominant anodes may comprise ~80 wt % Si, 5 wt % graphite and 15 wt % glassy carbon from the pyrolyzed resin and may be laminated on 15 μm Cu foil. The average loading may be 3.5-4.5 mg/cm$^2$. The control cathodes may comprise about 92 wt % NCM811, 4 wt % Super P and 4 wt % PVDF, and may be coated on 15 μm Al foil. The average loading is about 15-25 mg/cm$^2$. The 1.0 wt % conductive polymer monomer-containing NCM cathodes may comprise about 91 wt % NCM811, 1.0 wt % monomer additive (DFBTST), 4 wt % Super P and 4 wt % PVDF, and also coated on 15 μm Al foil with a similar loading as the control cathodes. The CV measurements may be carried out in the voltage range of 2-4.3 V at a scan rate of 0.2 mV s$^{-1}$, for example.

FIG. 6 shows a clear oxidation peak appears at ~4.1 V (vs. Li/Li$^+$) for the cell with the control cathode in the initial charge. This peak for modified NCM811 cathode (1 wt % DFBTST) cell downshifts to ~3.9 V (vs. Li/Li$^+$) in the initial charge. In the following scanning cycles, the oxidation and reduction peaks for the 1 wt % DFBTST-containing NCM811 half cells are at the similar positions with the control. FIG. 6 indicates that, in accordance with example embodiments of the disclosure, an additive-containing cathode (e.g., 1 wt % DFBTST) is able to reduce the polarization of the charging and discharging processes of NCM811 cathode half cells. This characteristic can lead to reduced interfacial impedance and enhanced cycling performance of Si-dominant anode//NCM811 cathode full cells.

Figures 7A, 7B:
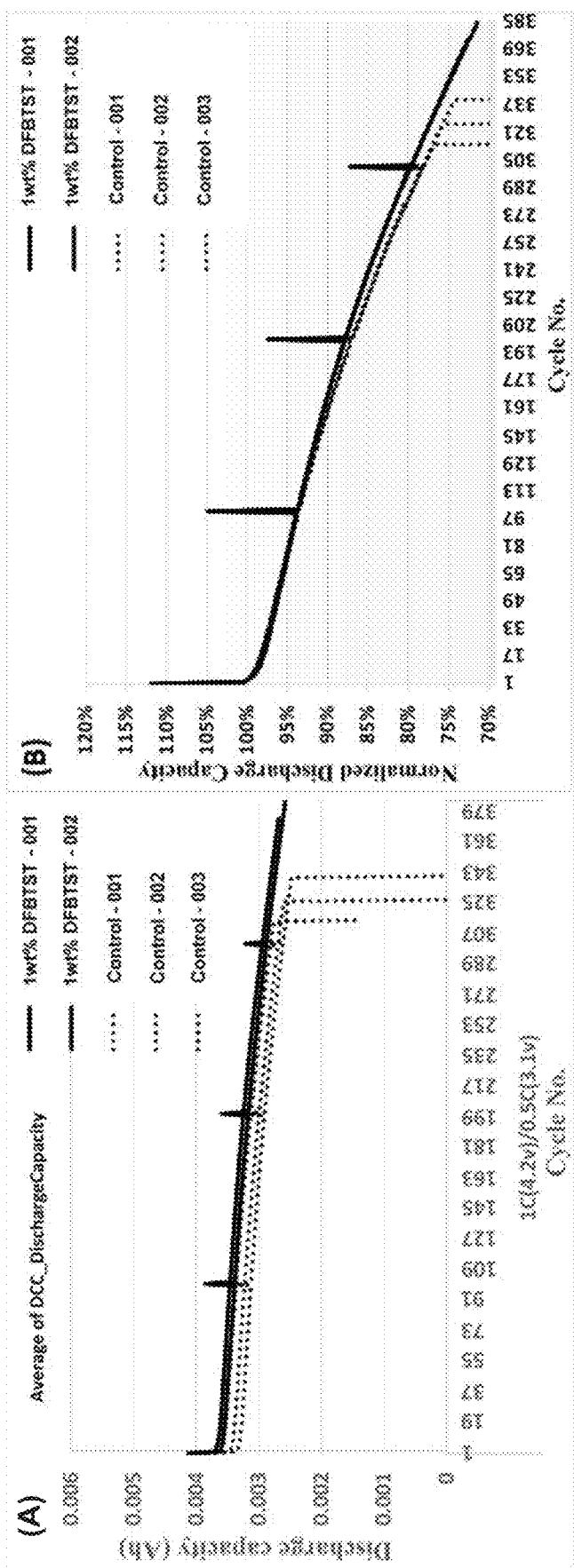
FIGS. 7A and 7B illustrate (A) capacity retention and, (B) normalized capacity retention plots for Si-dominant anode//NCM811 cathode coin full cells with control and polymer monomer additive-containing cathodes, in accordance with an example embodiment of the disclosure.

FIGS. 7A-7B illustrate capacity retention (A) and normalized capacity retention (B) of Si-dominant anode//NCM811 cathode coin full cells with control and 1.0% conductive polymer monomer additive-containing cathodes, in accordance with an example embodiment of the disclosure. The cathode used were: NCM811 Control (dotted line) and 1 wt % DFBTST-containing NCM811 (solid line). The Si-dominant anodes may contain about 80 wt % Si, 5 wt % graphite, and 15 wt % glassy carbon from pyrolyzed resin and may be laminated on 15 μm Cu foil. The average loading may be 3.5-4.5 mg/cm$^2$. The control cathodes may comprise about 92 wt % NCM811, 4 wt % Super P and 4 wt % PVDF5130, and may be coated on 15 μm Al foil. The average loading may be 20-25 mg/cm$^2$. The 1 wt % DFBTST-containing NCM811cathodes contain about 91 wt % NCM811, 1 wt % DFBTST, 4 wt % Super P and 4 wt % PVDF5130, and may be coated on 15 μm Al foil with a similar loading with control. The cells were tested at a nominal 25° C.

In an example scenario, the long-term cycling programs comprise: (i) At the 1$^{st}$ cycle, charge at 0.33 C to 4.2 V until 0.05 C, rest 5 minutes, discharge at 0.33 C to 3.1 V, rest 5 minutes; and (ii) from the 2$^{nd}$ cycle, charge at 1 C to 4.2 V until 0.05 C, rest 5 minutes, discharge at 0.5 C to 3.1 V, rest 5 minutes. After every 100 cycles, the test conditions in the 1$^{st}$ cycle may be repeated, which corresponds to the spikes in the curves depicted in FIG. 7.

As depicted in FIG. 7, the tests indicate that the 1 wt % DFBTST-containing NCM811 cathode-based coin full cells have better cycle performance than the control cells, even though the additive-containing cathode-based cells have larger discharge capacity than the control.

Figure 8:
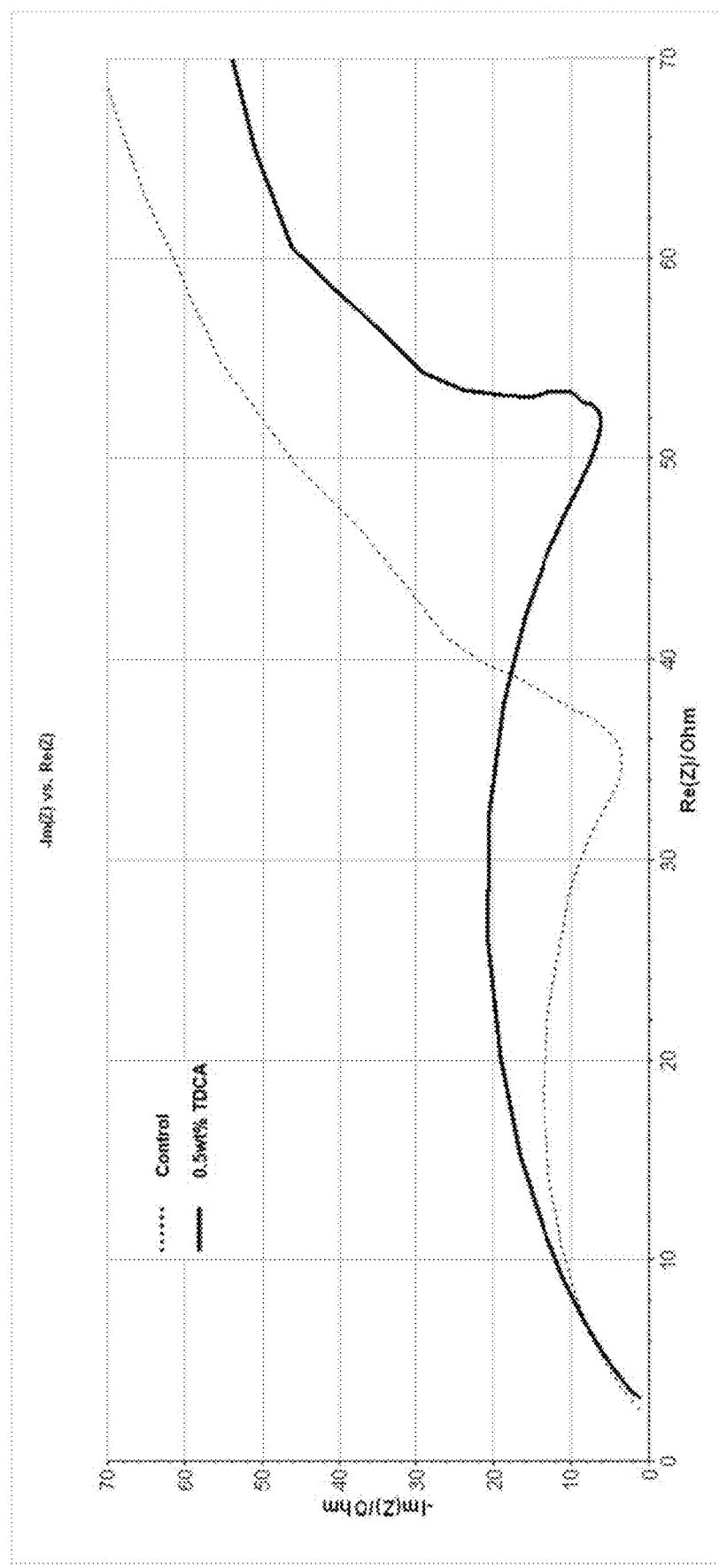
FIG. 8 illustrates Nyquist plots ($-Z''$ vs $Z'$) of cathode-based coin half cells without (control) and with polymer monomer additive, in accordance with an example embodiment of the disclosure.

In accordance with another example embodiment of the disclosure, another illustrative cathode may be prepared that incorporates at least one conductive polymer monomer. For example, a thiophene-based monomer such as 3,4-thiophenedicarboxylic anhydride (TCDA) may be incorporated into the manufacturing process of a cathode, such as NCM811, and added at about 0.5% by weight of the active material in accordance with an example embodiment of the disclosure. FIG. 8 illustrates a Nyquist plot (–Z" vs Z') overlay of a control NCM811 cathode (dotted lines) and a NCM811 cathode comprising 0.5% TCDA (solid line). Referring to FIG. 8, it is shown that initial cell resistance of both cells show similar values. Compared to the control, the cathode in accordance with an example embodiment of the disclosure shows a semi-circular trace, which suggests there may be two initial charge transfer reactions. Compared to the control, the cathode containing 0.5% TCDA showed about 52 ohms of charge transfer resistance, which is significantly higher than the control.

Figure 9:
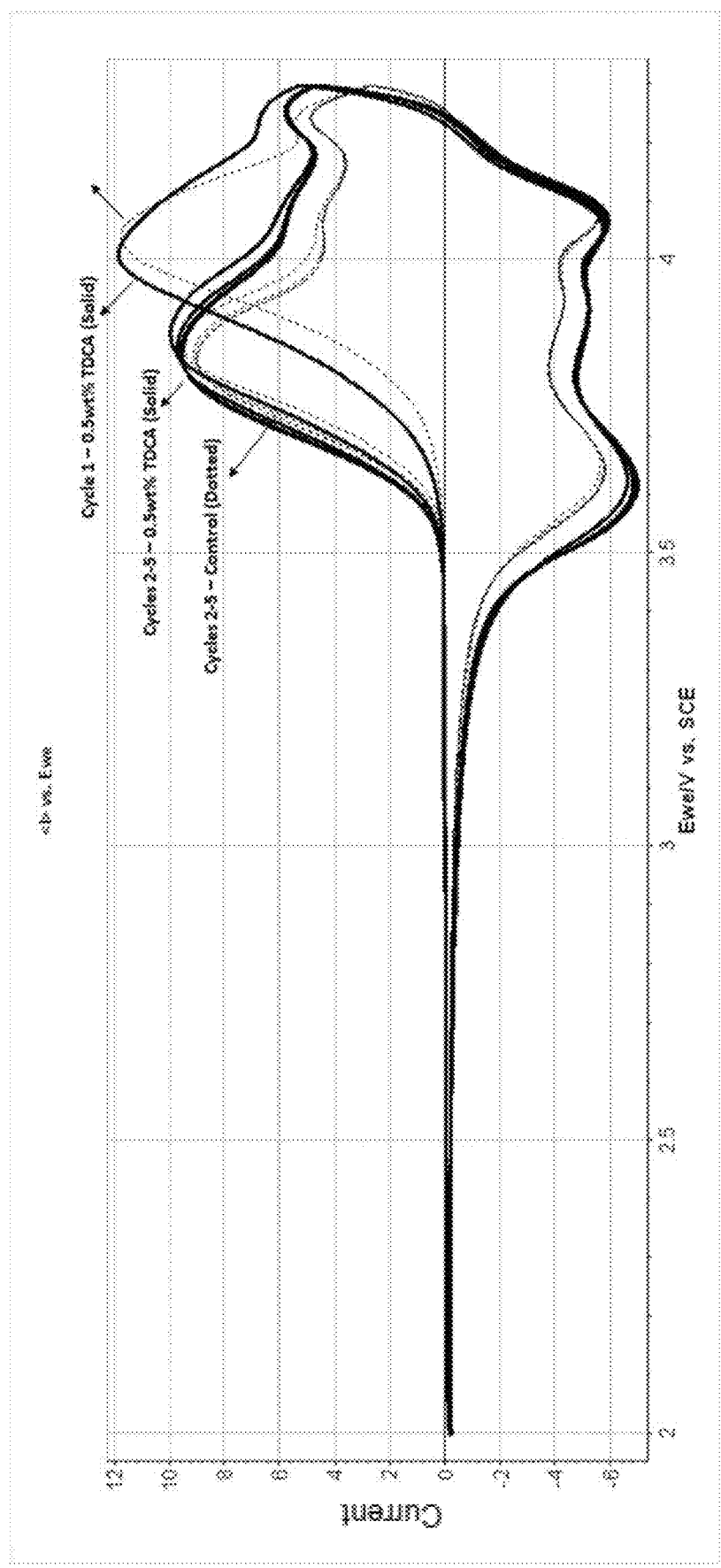
FIG. 9 illustrates a cyclic voltammetry (CV) trace for cathode-based coin half cells without (control) and with polymer monomer additive, in accordance with an example embodiment of the disclosure.

Referring to FIG. 9, there is shown cyclic voltammetry curves with dotted lines for control cathodes, without conductive polymer monomer additive, and solid lines for cathodes with 0.5% conductive polymer monomer additive (TCDA), both using NCM811. The plot shows potentials of the anode and cathode with respect to a saturated calomel electrode (SCE) at different cell current in milliamps. The electrolyte formulation may comprise 1.2 M LiPF$_6$ in FEC/EMC (3/7 wt %). In this example embodiment, the Si-dominant anodes may comprise ~80 wt % Si, 5 wt % graphite and 15 wt % glassy carbon from the pyrolyzed resin and may be laminated on 15 μm Cu foil. The average loading may be 3.5-4.5 mg/cm$^2$. The control cathodes may comprise about 92 wt % NCM811, 4 wt % Super P and 4 wt % PVDF, and may be coated on 15 μm Al foil. The average loading is about 15-30 mg/cm$^2$. The 0.5 wt % conductive polymer monomer-containing NCM cathodes may comprise about 91-91.5 wt % NCM811, 0.5 wt % monomer additive (TCDA), 4 wt % Super P and 4 wt % PVDF, and also coated on 15 μm Al foil with a similar loading as the control cathodes. The CV measurements may be carried out in the voltage range of 2-4.3 V at a scan rate of 0.2 mV s$^{-1}$, for example.

FIG. 9 shows a clear oxidation peak appears at ~4.1 V (vs. Li/Li$^+$) for the cell with the control cathode (i.e., AL-MCM-41-free NCM811) in the initial charge. This peak for modified NCM811 cathode in accordance with an example embodiment (0.5 wt % TCDA) cell downshifts to ~4.0 V (vs. Li/Li$^+$) in the initial charge. In the following scanning cycles, the oxidation and reduction peaks for the 0.5 wt % TCDA-containing NCM811 half cells are at the similar positions with the control. FIG. 9 indicates that, in accordance with example embodiments of the disclosure, an additive-containing cathode (e.g., 0.5 wt % TCDA) is able to reduce the polarization of the charging and discharging processes of NCM811 cathode half cells. This characteristic can lead to reduced interfacial impedance and enhanced cycling performance of Si-dominant anode//NCM811 cathode full cells.

Figures 10A, 10B:
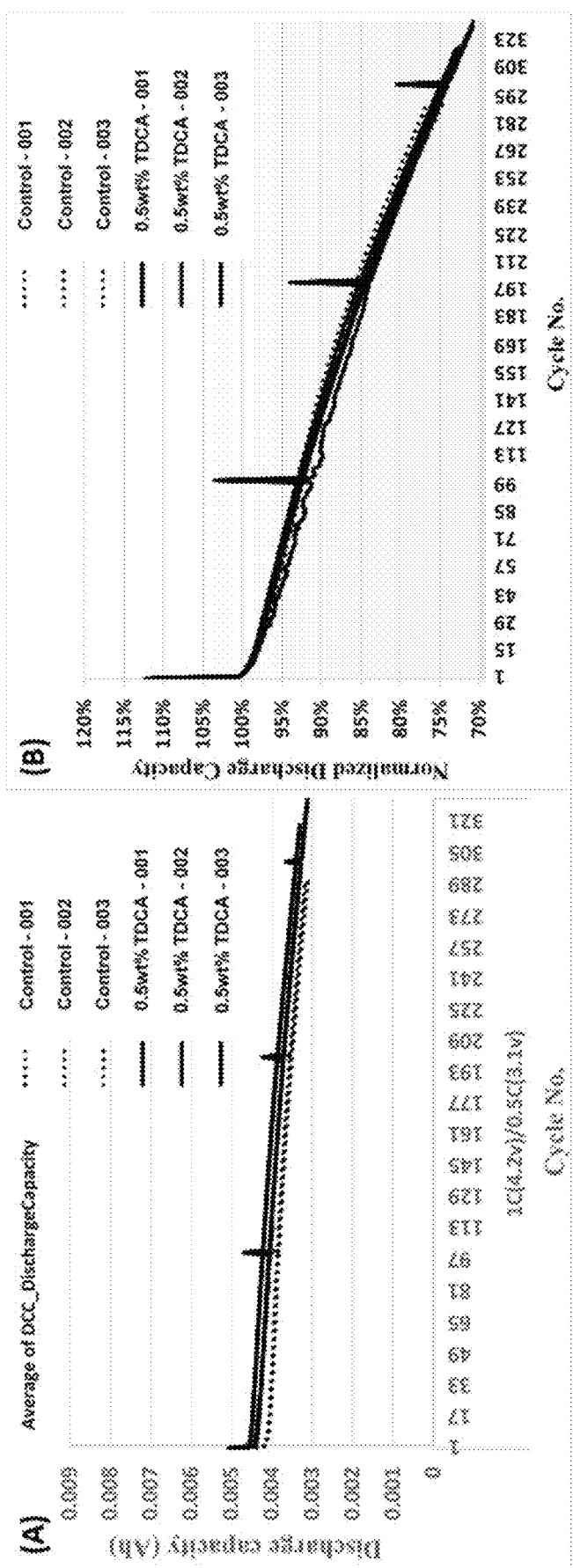
FIGS. 10A and 10B illustrate (A) capacity retention and, (B) normalized capacity retention plots for Si-dominant anode//NCM811 cathode coin full cells with control and polymer monomer additive-containing cathodes, in accordance with an example embodiment of the disclosure.

FIGS. 10A-10B illustrate capacity retention (A) and normalized capacity retention (B) of Si-dominant anode//NCM811 cathode coin full cells with control and 0.5% conductive polymer monomer additive-containing cathodes, in accordance with an example embodiment of the disclosure. The cathode used were: NCM811 Control (dotted line) and 0.5 wt % TCDA-containing NCM811 (solid line). In such example embodiments, the Si-dominant anodes may contain about 80 wt % Si, 5 wt % graphite, and 15 wt % glassy carbon from pyrolyzed resin and may be laminated on 15 μm Cu foil. The average loading may be 3.5-4.5 mg/cm$^2$. The control cathodes may comprise about 92 wt % NCM811, 4 wt % Super P and 4 wt % PVDF5130, and may be coated on 15 μm Al foil. The average loading may be 20-30 mg/cm$^2$. The 0.5 wt % TCDA-containing NCM811 cathodes contain about 91-91.5 wt % NCM811, 0.5 wt % TCDA, 4 wt % Super P and 4 wt % PVDF5130, and may be coated on 15 μm Al foil with a similar loading with control. The cells were tested at a nominal 25° C.

In an example scenario, the long-term cycling programs comprise: (i) at the $1^{st}$ cycle, charge at 0.33 C to 4.2 V until 0.05 C, rest 5 minutes, discharge at 0.33 C to 3.1 V, rest 5 minutes; and (ii) from the $2^{nd}$ cycle, charge at 1 C to 4.2 V until 0.05 C, rest 5 minutes, discharge at 0.5 C to 3.1 V, rest 5 minutes. After every 100 cycles, the test conditions in the $1^{st}$ cycle may be repeated, which corresponds to the spikes in the curves depicted in FIG. 10.

As depicted in FIGS. 10A-10B, the tests indicate that the 0.5 wt % TCDA-containing NCM811 cathode-based coin full cells have better cycle performance than the control cells, even though the additive-containing cathode-based cells have larger discharge capacity than the control.

Thus, the disclosure provides example embodiments that relate to a battery, the battery comprising: a silicon-based anode, an electrolyte, and a cathode, wherein the cathode comprises an active material and a conductive polymer monomer additive comprising an aniline, a pyrrole, or a thiophene, or a combination thereof. In other example embodiments, the disclosure relates to a battery, the battery comprising: a silicon-based anode, an electrolyte, and a cathode, wherein the anode comprises an active material and a conductive polymer monomer additive comprising an aniline, a pyrrole, or a thiophene, or a combination thereof. In yet other example embodiments, the disclosure relates to a battery, the battery comprising: a silicon-based anode, an electrolyte, and a cathode, wherein the electrolyte comprises an electrolyte material and a conductive polymer monomer additive comprising an aniline, a pyrrole, or a thiophene, or a combination thereof.

The disclosure provides example embodiments that relate to a cathode, wherein the cathode may comprise an active material and a conductive polymer monomer additive comprising an aniline, a pyrrole, or a thiophene, or a combination thereof.

The disclosure provides example embodiments that relate to an anode, wherein the anode may comprise an active material and a conductive polymer monomer additive comprising an aniline, a pyrrole, or a thiophene, or a combination thereof.

The disclosure provides example embodiments that relate to an electrolyte, wherein the electrolyte may comprise an electrolyte material and a conductive polymer monomer additive comprising an aniline, a pyrrole, or a thiophene, or a combination thereof.

The disclosure provides example embodiments that relate to a method of forming a battery, wherein the method may comprise: forming a battery comprising a silicon-based anode, an electrolyte, and a cathode, wherein the cathode, the anode, and/or the electrolyte comprises a conductive polymer monomer additive comprising an aniline, a pyrrole, or a thiophene, or a combination thereof. In some example embodiments the disclosure provides a method of forming a cathode, an anode, and/or an electrolyte comprising adding a conductive polymer monomer additive comprising an aniline, a pyrrole, or a thiophene, or a combination thereof to the cathode, the anode, and/or the electrolyte.

In any of the above example embodiments, the battery, the cathode, or the method may comprise a cathode active material comprising one or more of: nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides of the structure $LiNi_{1-x}M_xO_2$ where M=Co, Mn, or Al, Li-rich $xLi_2MnO_3(1-x)LiNi_aCo_bMn_cO_2$, Li-rich layered oxides of the structure $LiNi_{1+x}M_{1-x}O_2$ where M=Co, Mn, or Ni, and spinel oxides $LiNi_{0.5}Mn_{1.5}O_4$. In example embodiments, the battery, the cathode, or the method may comprise a conductive polymer monomer additive that comprises at least one thiophene selected from 3,4-thiophenedicarboxylic anhydride (TDCA), 3,4-difluoro-2,5-bis(trimethylsilyl)thiophene (DFBTST), 1-(2-cyanoethyl) pyrrole (CEP), or thiophene-2-carboxylic anhydride (TCA). In example embodiments, the battery, the cathode, or the method may comprise a conductive polymer monomer additive that comprises at least one pyrrole selected from 1H-pyrrole-2-carbonitrile, 1-ethenyl-1H-pyrrole, 2-ethenyl-1H-pyrrole, 1-ethynyl-1H-pyrrole, 2-ethynyl-1H-pyrrole, 3-ethynyl-1H-pyrrole, 1-vinyl-1H-pyrrole-2,5-dione, 2-ethenyl-1H-pyrrole, 1-(prop-2-enyl)pyrrole, 1,3,4-tris(prop-2-enyl)pyrrole; 1H-pyrrole-1-carboxylic anhydride, acetic 1H-pyrrole-3-carboxylic anhydride, 1-prop-2-enylpyrrole-2,5-dione, 3-prop-2-enylpyrrole-2,5-dione, or 3,4-bis(prop-2-enyl)pyrrole-2,5-dione. In example embodiments, the battery, the cathode, or the method may comprise a conductive polymer monomer additive that comprises at least one aniline selected from aniline, aniline (hydrochloride), 3-(trifluoromethyl)aniline, 2-nitroaniline, 4-cyano-3-(trifluoromethyl)aniline, aniline-2-sulfonic acid, or 4, 4'-methylenedianiline. In such example embodiments, the conductive polymer monomer additive may comprise 5% or less by weight of the active material. In further such example embodiments, the conductive polymer monomer additive may comprise 1% or less by weight of the active material. In example embodiments, the battery may comprise an anode comprising an active material that comprises between 50% to 95% silicon. In some example embodiments, the battery may comprise a lithium ion battery. In some further example embodiments, the battery comprises an electrolyte comprising a liquid, solid, or gel.

In some example embodiments, the disclosure provides a cathode that may comprise an active material and at least one conductive polymer monomer additive comprising an aniline, a pyrrole, or a thiophene, wherein the thiophene may be selected from 3,4-thiophenedicarboxylic anhydride (TDCA), 3,4-difluoro-2,5-bis(trimethylsilyl)thiophene (DFBTST), or thiophene-2-carboxylic anhydride (TCA); the pyrrole may be selected from 1-(2-cyanoethyl) pyrrole (CEP), 1H-pyrrole-2-carbonitrile, 1-ethenyl-1H-pyrrole, 2-ethenyl-1H-pyrrole, 1-ethynyl-1H-pyrrole, 2-ethynyl-1H-pyrrole, 3-ethynyl-1H-pyrrole, 1-vinyl-1H-pyrrole-2,5-dione, 2-ethenyl-1H-pyrrole, 1-(prop-2-enyl)pyrrole, 1,3,4-tris(prop-2-enyl)pyrrole, 1H-pyrrole-1-carboxylic anhydride, acetic 1H-pyrrole-3-carboxylic anhydride, 1-prop-2-enylpyrrole-2,5-dione, 3-prop-2-enylpyrrole-2,5-dione, or 3,4-bis(prop-2-enyl)pyrrole-2,5-dione; the aniline may be selected from aniline, aniline (hydrochloride), 3-(trifluoromethyl)aniline, 2-nitroaniline, 4-cyano-3-(trifluoromethyl)aniline, aniline-2-sulfonic acid, or 4,4'-methylenedianiline.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
   a silicon-based anode, an electrolyte, and a cathode, wherein the cathode comprises an active material and a conductive polymer monomer additive comprising a thiophene;
   wherein the conductive polymer monomer additive comprises 1% or less by weight of the active material;
   wherein the anode comprises an active material that comprises between 50% to 95% silicon; and
   wherein said thiophene is at least one thiophene selected from 3,4-difluoro-2,5-bis(trimethylsilyl)thiophene (DFBTST) and thiophene-2-carboxylic anhydride (TCA).

2. The battery according to claim 1, wherein the cathode active material comprises one or more of: nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides of the structure $LiNi_{1-x}M_xO_2$ where M=Co, Mn, or Al, Li-rich $xLi_2MnO_3(1-x)LiNi_aCo_bMn_cO_2$, Li-rich layered oxides of the structure $LiNi_{1+x}M_{1-x}O_2$ where M=Co, Mn, or Ni, and spinel oxides $LiNi_{0.5}Mn_{1.5}O_4$.

3. The battery according to claim 1, wherein the battery comprises a lithium ion battery.

4. The battery according to claim 1, wherein the electrolyte comprises a liquid, solid, or gel.

5. A method of forming a battery, the method comprising:
   forming a battery comprising a -silicon-based anode, an electrolyte, and a cathode, wherein the cathode comprises an active material and a conductive polymer monomer additive comprising an a thiophene;
   wherein the conductive polymer monomer additive comprises 1% or less by weight of the active material;
   wherein the anode comprises an active material that comprises between 50% to 95% silicon; and
   wherein said thiophene is at least one thiophene selected from 3,4-difluoro-2,5-bis(trimethylsilyl)thiophene (DFBTST) and thiophene-2-carboxylic anhydride (TCA).

6. The method according to claim 5, wherein the cathode active material comprises one or more of: nickel cobalt aluminum oxide (NCA), nickel cobalt manganese oxide (NCM), lithium iron phosphate (LFP), lithium cobalt oxide (LCO), and lithium manganese oxide (LMO), Ni-rich layered oxides of the structure $LiNi_{1-x}M_xO_2$ where M=Co, Mn, or Al, Li-rich $xLi_2MnO_3(1-x)LiNi_aCo_bMn_cO_2$, Li-rich layered oxides of the structure $LiNi_{1+x}M_{1-x}O_2$ where M=Co, Mn, or Ni, and spinel oxides $LiNi_{0.5}Mn_{1.5}O_4$.

7. The method according to claim 5, wherein the battery comprises a lithium ion battery and the electrolyte comprises a liquid, solid, or gel.

8. A cathode, the cathode comprising:
   an active material and at least one conductive polymer monomer additive comprising a thiophene, wherein
   the thiophene is 3,4-difluoro-2,5-bis(trimethylsilyl)thiophene (DFBTST), or thiophene-2-carboxylic anhydride (TCA); and
   wherein the conductive polymer monomer additive comprises 1% or less by weight of the active material.

* * * * *